(12) United States Patent
Angelov et al.

(10) Patent No.: US 9,847,924 B2
(45) Date of Patent: Dec. 19, 2017

(54) SYSTEM FOR IDENTIFYING ILLEGITIMATE COMMUNICATIONS BETWEEN COMPUTERS BY COMPARING EVOLUTION OF DATA FLOWS

(71) Applicant: Lancaster University Business Enterprises Ltd., Lancaster (GB)

(72) Inventors: Plamen Angelov, Lancaster (GB); Radovan Bruncak, Lancaster (GB); David Hutchison, Lancaster (GB); Steven Simpson, Lancaster (GB); Paul Smith, Lancaster (GB)

(73) Assignee: Lancaster University Business Enterprises, Ltd., Lancaster (GB)

( * ) Notice: Subject to any disclaimer, the term of this patent is extended or adjusted under 35 U.S.C. 154(b) by 280 days.

(21) Appl. No.: 14/677,283

(22) Filed: Apr. 2, 2015

(65) Prior Publication Data

US 2015/0304198 A1    Oct. 22, 2015

Related U.S. Application Data

(63) Continuation of application No. PCT/GB2013/052636, filed on Oct. 9, 2013.

(30) Foreign Application Priority Data

Oct. 10, 2012   (GB) .................................. 1218218.4

(51) Int. Cl.
*H04L 29/06*  (2006.01)
*H04L 12/26*  (2006.01)

(52) U.S. Cl.
CPC .......... *H04L 43/0876* (2013.01); *H04L 43/12* (2013.01); *H04L 63/145* (2013.01);
(Continued)

(58) Field of Classification Search
CPC ............... H04W 12/08; H04L 63/1441; H04L 63/1416; H04L 63/0227; H04L 43/0876;
(Continued)

(56) References Cited

U.S. PATENT DOCUMENTS 8,195,750 B1    6/2012 Bakhmutov
8,402,543 B1 *  3/2013 Ranjan ................ H04L 63/1416
                                               709/223
(Continued)

OTHER PUBLICATIONS

International Search Report dated Dec. 12, 2013 from International Application No. PCT/GB2013/052636.
(Continued)

*Primary Examiner* — Le H Luu
(74) *Attorney, Agent, or Firm* — Beyer Law Group LLP

(57) ABSTRACT

A method and apparatus for identifying similar and coordinated communications between computers connected by a network are described. Communications between a plurality of pairs of computers are monitored to obtain respective flow metrics for a first and second pair of computers. The flow metric represents at least one property of the data flow between the pair of computers. Representations of the evolution of the data flows between the pairs of computers are updated using the flow metrics. The representations of the evolution of the data flows are compared to determine the similarity of the data flows between the pairs of computers. The first pair of computers and the second pair of computers are identified as exhibiting similar and coordinated communication if their data flows are determined to be similar.

20 Claims, 12 Drawing Sheets

(52) U.S. Cl.
CPC ...... H04L 63/1408 (2013.01); H04L 63/1425 (2013.01); H04L 63/1441 (2013.01); H04L 63/16 (2013.01)

(58) Field of Classification Search
CPC . H04L 43/12; H04L 63/1408; H04L 63/1425; H04L 63/145; H04L 63/16; G06F 21/568; G06F 21/554; G06F 21/552; G06F 21/53; G06F 17/30516; F41H 13/00
See application file for complete search history.

(56) References Cited

U.S. PATENT DOCUMENTS

| | | | | |
|---|---|---|---|---|
| 8,881,282 B1* | 11/2014 | Aziz | ..................... | G06F 21/554 726/23 |
| 9,118,702 B2* | 8/2015 | MaCaulay | ............ | G06F 21/552 |
| 9,369,433 B1* | 6/2016 | Paul | ................... | H04L 63/0227 |
| 2008/0080518 A1* | 4/2008 | Hoeflin | ............... | H04L 63/1416 370/395.42 |
| 2009/0204964 A1* | 8/2009 | Foley | ..................... | G06F 21/53 718/1 |
| 2010/0138377 A1* | 6/2010 | Wright | .............. | G06F 17/30516 706/52 |
| 2010/0250497 A1* | 9/2010 | Redlich | .................. | F41H 13/00 707/661 |
| 2011/0138463 A1 | 6/2011 | Kim et al. | | |
| 2011/0179164 A1* | 7/2011 | Memon | ............... | H04L 63/1441 709/224 |
| 2012/0233694 A1* | 9/2012 | Baliga | .................. | G06F 21/568 726/23 |
| 2012/0240183 A1* | 9/2012 | Sinha | .................... | H04W 12/08 726/1 |

OTHER PUBLICATIONS

Written Opinion dated Dec. 12, 2013 from International Application No. PCT/GB2013/052636.
Beringer et al., "Online Clustering of Parallel Data Streams," Data & Knowledge Engineering, vol. 58 Issue 2, Aug. 2006, pp. 1-29.
Search Report dated Feb. 12, 2013 from GB Application No. 1218218.4.
Zeidanloo et al., "Botnet Detection Based on Traffic Monitoring", 2010 International Conference on Networking and Information Technology, downloaded on Dec. 2, 2013.

* cited by examiner

SYSTEM FOR IDENTIFYING ILLEGITIMATE COMMUNICATIONS BETWEEN COMPUTERS BY COMPARING EVOLUTION OF DATA FLOWS

This application is a Continuation of International Application No. PCT/GB2013/052636, filed on Oct. 9, 2013, the contents of which are incorporated herein by reference in their entirety.

The present invention relates to computer networks and in particular to identifying unwanted communications between computers over a network and counteracting unwanted communication.

Computer networks allow communication between the computers connected to the network over the network. Some communications are desired or intended, such as sending emails or transferring data files between computers, whereas some communications are undesired or unwanted, such as spam email or other intrusions. Unwanted communications cause problems not just for the sender and/or recipient of the communications, but also for other users of the network as they reduce the bandwidth available for legitimate uses. Also, intrusions or attacks on computers connected to the network are unwanted by the user of the machine being attacked.

For example, a well known phenomenon on computer networks is that of botnets in which a plurality of computers are infected with malware which then either sends out messages to other computers connected to the network and/or sends out malware to try and infect other computers so that they also become part of the network of infected computers. A command and control computer can then issue instructions to the infected computers causing them to carry out various unwanted acts such as sending messages, data or trying to cause software to be installed on other computers. Botnets can be very wide spread. For example, it is estimated that many botnets can involve anywhere from hundreds of thousands to millions, or tens of millions, of different computers.

Remediating botnets is challenging. It has proved very difficult to deal with botnets effectively and in a timely manner so they usually cause harm for significant periods of time. For example, Rustock was a prominent botnet. It was finally shut down after five years of its operation. MegaD is another similar example and is a spamming botnet that was not successfully shut down during an attempt in 2009.

Currently, human off-line remediation tends to be used, commonly based on botnet command-and-control sink-holing to take over botnets on the Internet. If the take-over is successful, and can be sustained, the effects of a botnet can be neutralized by acting appropriately on the bots. However, it has proved very difficult to successfully or effectively remediate botnets. One reason is the length of time it takes humans to attempt off-line remediation, during which the botnet can 'move', for example by allowing the malicious attackers (creators or operators of botnets) to respond further. Without the ability to exercise faster, and preferably real-time, control over botnets on the Internet, it will be difficult to achieve significantly better results.

Although significant research has been done on botnets, relatively little work has been done on botnet remediation. The majority of the work has focused on botnet detection.

An algorithm for online clustering of parallel data streams is described in J. Beringer and E. Hüllermeier, "Online clustering of parallel data streams," Data and Knowledge Engineering, vol. 58, no. 2, pp. 180-204, 2006. However, the algorithm is applicable to synchronous data streams only. Illegitimate network flows, such as botnet network flows, are often asynchronous, making the comparison difficult. Further, the algorithm does not have the capability to compare network flows at different stages.

An approach that can more rapidly identify and remediate unwanted network communications, such as those arising from botnets, would be beneficial.

The present invention is based on the insight that unintended network communications evolve similarly while intended network communications evolve uniquely.

The invention looks for similarly evolving network communication flows generated by machines connected over a network. If at least two network communication flows are found to be evolving similarly to each other, then these flows can be identified as similar and coordinated communications and which may be, in particular, unintended or unwanted network traffic. Remediation can then be initiated by applying remedies to these flows in sequence, e.g. by setting network filters. By doing so, the invention can neutralize the effects of this unintended network traffic quickly and in some instances in real-time.

In this context, real-time refers to how quickly the remediation is achieved. Ideally, close to zero time delay is wanted. In practice, short time delays may be incurred in order to improve certainty in identifying unwanted network traffic before executing real-time remediation, i.e. introducing measures to terminate, or reduce, the unwanted network traffic flows within their lifetime.

A first aspect of the invention provides a method of identifying similar and/or coordinated communications between a plurality of computers connected by a network. The method can comprise monitoring communications between a plurality of pairs of computers over the network to obtain a first flow metric for a first pair of computers and a second flow metric for a second pair of computers. The first flow metric represents at least one property of a first data flow between the first pair of computers and the second flow metric represents at least one property of a second data flow between the second pair of computers. A representation of the evolution of the first data flow between the first pair of computers is updated using the first flow metric and/or a representation of the evolution of the second data flow between the second pair of computers is updated using the second flow metric. The representation of the evolution of the first data flow is compared to the representation of the evolution of the second data flow to determine the similarity of the first data flow and the second data flow. The first pair of computers and the second pair of computers can be identified as exhibiting similar and/or coordinated communication if the first data flow and second data flow are determined to be similar.

Hence, by comparing how the flow of data between pairs of computers evolves over time, it is possible to identify pairs of computers exhibiting similar and/or coordinated communication as their data flows tend to evolve similarly over time. In contrast data flows between pairs of computers which are exhibiting legitimate communications tend not to evolve similarly over time owing to the ad hoc way in which the individual computers are used by individual users.

The similar and/or coordinated communication can be an illegitimate communication. Hence, the invention can be used to identify computers on a network which are participating in illegitimate communications.

The method is particularly suitable for identifying botnets.

Various flow metrics can be used which provide a quantitative measure of some property or attribute of the data passing between the pair of computers and which characterises the data flow between them. For example, the flow metric can include the average number of bytes per unit time transmitted between the pair of computers and/or the average number of bytes per packet transmitted between the pair of computers.

The method can further comprise an initial step of identifying computers that are a source of similar and/or coordinated communication, such as illegitimate communication. This can include determining the IP address of a computer that is a source of similar and/or coordinated communication. The method can then comprise only monitoring communications between a pair of computers if at least one of the computers of the pair has been identified as a source of similar and/or coordinated communication. Hence, only network traffic involving at least one computer identified as a source of similar and/or coordinated communication needs to be monitored.

The method can further comprise using a self-organizing map to arrange the representations of the evolution of the data flow by similarity. In that case only representations within a limited range of similarity are compared. This helps to reduce the number of representations that need to be compared hence reducing computational burden. For example, only representations within a range of 1% similarity are compared.

Clustering can be used. The representation of the evolution of the data flow can comprise a sequence of clusters of the flow metric. A recursive clustering algorithm can be used in order further to reduce the computational burden.

Representations of evolutions for which less than a specific number of packets have been received can be excluded from comparison. This helps to avoid comparing evolutions which are not yet sufficiently mature for their similarity to be reliably assessed. The specific number of packets can be at least 10, and 12 packets has been found to be particularly useful.

Comparing the representations can include determining if any cluster of the representation of the evolution of the first data flow matches more than one cluster of the representation of the evolution of the second data flow. This rule has been found to help provide a low number of false positive and false negative determinations of similarity.

Comparing the representations can include determining if a pair of first clusters and a pair of second clusters of the representation of the evolution of the first data flow and the representation of the evolution of the second data flow match. This rule has been found to help provide a low number of false positive and false negative determinations of similarity A match between clusters can be determined based on the separation of the centres of the clusters and/or the support of the clusters and/or the radius of the clusters.

The method can further comprise remediating communication between the first pair of computers and/or the second pair of computers if they are identified as exhibiting illegitimate communication. Remediating communication can comprise one or more of: blocking; filtering, and switching. Any technique to stop or reduce the number of packets being sent between the pair of computers can be used.

The method can further comprise clearing a representation of the evolution of a data flow from memory when the data flow is determined unlikely to correspond to illegitimate communication. This helps to increase memory availability while still providing a reliable mechanism for identifying illegitimate communications.

The representation of the evolution can be removed from memory if the age of the representation of the evolution is greater than the age of the representation of the evolution of the first data flow or second data flow for the first pair of computers and the second pair of computers that have been identified as exhibiting illegitimate communication.

The representation of the evolution can be removed from memory a fixed period of time after the first pair of computers and the second pair of computers that have been identified as exhibiting illegitimate communication. The fixed period of time can be, for example, 1 minute.

When a representation is cleared from memory the representation can also be removed from the self-organized map when the self-organized map feature is being used.

Each data flow over the network can be treated separately at a network level by a tuple including a source IP address and a destination IP address. Information specifying the direction of the communication, the port from which the communication was sent or port at which the communication was received need not be used in the tuple.

The method can be a real-time method.

A second aspect of the invention provides a data processing apparatus or system comprising one or more data processing devices and one or more computer readable media, the computer readable medium or media storing computer program code executable by the data processing device or devices to carry out the method aspect of the invention.

The data processing apparatus can include a router, comprise a router, or consist solely of a router. In some applications, the entire data processing apparatus or system can be provided as part of a router.

The apparatus or system can be distributed over different physical devices which are in communication.

A third aspect of the invention provides one or more computer readable media storing computer program code executable by one or more data processing devices to carry out the method aspect of the invention.

An embodiment of the invention will now be described in detail, by way of example only, and with reference to the accompanying drawings, in which.

Similar items in different Figures share common reference signs unless indicated otherwise.

The present invention will be illustrated within the context of botnet identification and remediation. However, it will be appreciated that the principles of the invention can be applied to other circumstances in which it is desired to detect unwanted, or unauthorised communications (referred to generally herein as illegitimate communications) and take action to ameliorate or otherwise reduce the effect of those illegitimate communications on network traffic and/or other computers to which the illegitimate communications are targeted. These might include illegitimate file downloading activities, such as those arising from peer to peer file sharing.

Figure 1:
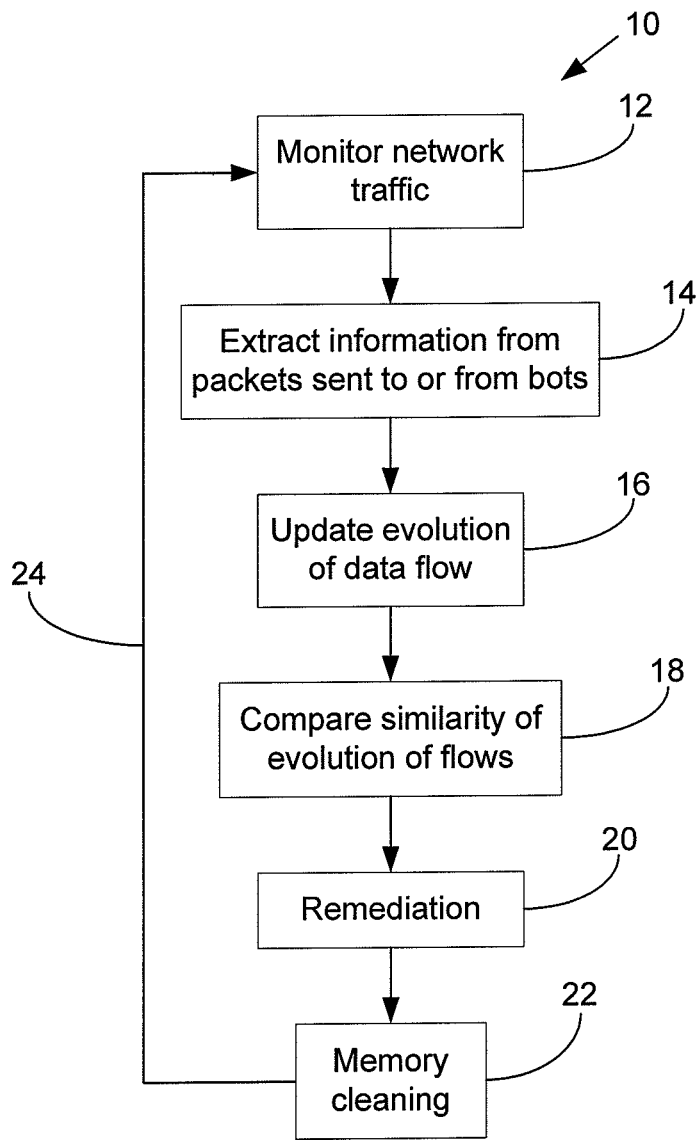
FIG. 1 shows a flow chart illustrating a data processing method of identifying and remediating illegitimate network traffic according to the invention.

With reference to FIG. 1, there is shown a flow chart illustrating a data processing method 10 for identifying and remediating illegitimate communications in a computer network. The method 10 generally involves the passive monitoring 12 of external-external, and internal-external network traffic to gain greater visibility and control over botnet network traffic from a single monitoring point. Depending on the topology of the network, external-external traffic may be monitored at vantage points, e.g. edge routers, or by monitoring peer traffic, or monitoring transport traffic from customer networks of an ISP. The method monitors and analyses only network traffic of those machines on the network that are visible to the system.

As explained in greater detail below, only traffic to or from a machine that has previously been identified as being a bot is monitored at step 12. For each observed packet generated by bots, at step 14, information is extracted from each packet and the method identifies the network flow that the packet belongs to, and recursively updates calculations of several statistical features of that flow. Then at step 16 the evolution of that flow is updated by recursively clustering the updated features of the flow, using an evolving recursive clustering system mechanism to characterize how that flow has been evolving. The recursive clustering mechanism is described in greater detail in P. Angelov, "An Approach for Fuzzy Rule-based Adaptation Using On-line Clustering," International Journal of Approximate Reasoning, 35(5), 275-289, 2004 and International Patent Application Publication No. WO2008/053161 which are incorporated herein by reference in their entirety for all purposes. The method maintains these flow evolutions in a self-organizing map, which stores roughly similar flow evolutions close to each other. Self-organizing maps are described generally in T. Kohonen, "The self-organizing map," The IEEE, vol. 79, no. 9, pp. 1464-1480, 1990, which is incorporated herein by reference in its entirety for all purposes.

When an evolution is updated at step 16, then at step 18, the method compares the updated flow evolution with evolutions of other flows within in a given zone of interest. If it is determined at step 18 that the evolution of at least two flows are sufficiently similar, then remediation can be initiated at step 20. Remedies can be applied at step 20 across the machines identified as being bots, and the remediation can gain the benefits of addressing reconnection of these bots if they use fail back mechanisms. Memory cleaning processed can optionally be carried out at step 22. As illustrated by process flow return line 24, the method 10 operates generally constantly and continues monitoring network traffic and processing that network traffic as described above at all times, irrespective of whether any remediation and memory cleaning actions are carried out at steps 20 and 22.

In greater detail, two network flows are identified as having evolved similarly at step 18 if their evolution over time shows similar characteristics. The method is based on the existence of a distinctive forking in evolution of network flows between illegitimate network flows, for example of botnets, which are expected to evolve similarly, and legitimate network flows, of benign network services, which are expected to evolve uniquely for the purpose of real-time remediation of the illegitimate network flows.

For the purpose of real-time remediation, the method looks for both asynchronous similarly evolving network flows (meaning that the evolutions of the two network flows are similar, but may be shifted in time) and synchronous similarly evolving network flows, which can be the case if the illegitimate network flows are strictly synchronized, e.g. using the network time protocol.

As indicated above, the process 10 takes initial input of data which identifies machines on the network which have already been determined to be the source of illegitimate network communication. Any process or method which can localize such machines, e.g. bots, on the Internet can be used. For example, a suitable bot identification systems is BotMiner (as described in G. Gu, R. Perdisci, J. Zhang, and W. Lee, "BotMiner: Clustering Analysis of Network Traffic for Protocol and Structure Independent Botnet Detection," USENIX Security Symposium, 2008) while running on an adaptive traffic sampling mechanism (as described in J. Zhang, X. Luo, R. Perdisci, G. Gu, W. Lee, and N. Feamster, "Boosting the Scalability of Botnet Detection Using Adaptive Traffic Sampling," ACM Symposium on Information, Computer and Communications Security, 2011) allows the application of BotMiner to high speed and high volume networks. Alternatively, or additionally, BotMagnifier (as described in G. Stringhini, T. Holz, B. Stone-Gross, C. Kruegel, and G. Vigna, "BotMagnifier: Locating Spambots on the Internet," USENIX Security Symposium, 2011) or BotGrep (as described in S. Nagaraja, P. Mittal, C.-Y Hong, M. Caesar, and N. Borisov, "BotGrep: Finding Bots with Structured Graph Analysis," USENIX Security Symposium, 2010), or their combination, can be used.

Real-time control over botnet network traffic on the Internet might be achieved from the Tier-1 ISP level only, as results of a study indicate that 60% of inter-bot paths of structured P2P botnets traverse Tier-1 ISPs. That number increases to 89% in the most affected autonomous systems.

The method can ameliorate the effects of bots in the botnet under remediation by applying remedies until the botnet has been shut down successfully, or effective procedures are deployed that successfully recover the bots from infection. The method 10 addresses the case where disruption to users is undesirable, e.g. remediating the botnet's effects on the victims without a need of the users assistance or the users cooperation in cleaning bot software from their machines. Manual remediation aiming to clean bots from infected machines on the network is not an optimal solution, although such activities will improve matters. The method can at the very least be used as a real-time botnet detector which can also enhance manual off-line remediation by users.

It is believed that the method allows the remediation of at least botnets on the Internet in real time and gaining real-time control over botnet network traffic.

As discussed above, the faster the remediation is applied, the stronger the control over botnet network traffic becomes. Therefore, ideally the remediation method fulfils several objectives. Firstly, the method should be accurate, with low false positives and low false negatives. False positives lead to undesirable disturbance of benign network services, while false negatives may lead to ineffective remediation, as botnet flows are missed. Secondly, the method should work for high-speed and high-volume networks, preferably at the Tier-1 or Tier-2 ISP level, in order to remediate botnets on the Internet in real-time. The method needs to be able to keep pace with passing network traffic, or else its observations will become incomplete, which may then effect the ability to perform the remediation. Thirdly, the method needs to have strong potential to combat current and future mutated botnets on which a lasting foundation of remediation can be established.

Figure 2:
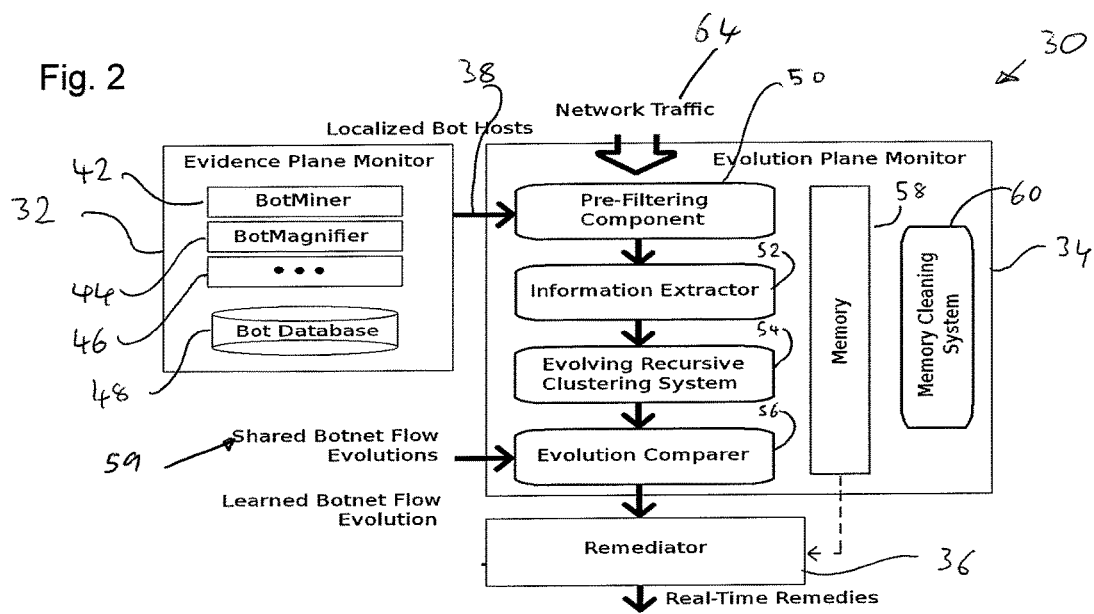
FIG. 2 shows a schematic diagram of a system according to the invention and including data processing apparatus according to the invention for carrying out the method of the invention.

FIG. 2 shows a schematic diagram of a data processing system architecture which includes data processing apparatus according to the invention. The overall system 30 has three main components, a bot identifier component 32, a botnet identifier component 34 and a remediator component 36.

The bot identifier component 32 provides input 38 to the botnet identifier 34 which indicates machines on the network which have already been identified as being part of a bot net. As discussed above, the bot identifier component 32 can include one or more modules implementing the BotMiner 42, BotMagnifier 44 or other mechanisms 46 for identifying bot machines. A database 48 may also be provided for storing data, such as IP addresses, which identifies and/or locates bot machines.

The botnet identifier component 34 includes a packet filtering mechanism 50, a mechanism 52 for extracting information from packets and generating packet summary information, a mechanism 54 for updating the evolution of the network flows and a mechanism 56 for comparing the network flow evolutions. A memory 58 is provided for storing the various data items generated and processed by the botnet identifier 34 and a memory management component 60 is also provided to clean old data from memory 58. Finally, the system 30 includes a remediator 36 which acts to apply real time remedies to the network to help reduce or eliminate botnet traffic.

The botnet identifier 34 takes mirrored network traffic as input 64 at a vantage point of an ISP network. The botnet identifier also takes input 38 from the bot identifier 32 which identifies bots on the Internet. The pre-filtering component 50 acts to filter out network traffic that is not to or from identified bots.

The information extractor component 52 summarizes each observed packet that has not been filtered out by filtering component 50. The information extractor determines which flow each packet belongs to. As used herein a "flow" is all packets sent between a unique or specific pair of computers on the network. So a first flow exists between a first bot computer and a second computer (and includes all packets sent from the bot computer to the second computer and all packets sent from the second computer to the bot computer). A second flow can exist between the first bot computer and a third computer different to the second computer. A third flow can exist between a second bot computer and the second computer. Hence, a separate and distinct flow can exist for each unique pair of computers, in which at least one of the computers is a bot. For each flow, a flow structure is maintained. The flow structures are clustered in order to model the evolution of the characteristics of each flow by the flow evolution modelling component 54.

In particular, the flow evolution modelling component 54 uses a recursive clustering approach which takes the packet summary information to update the evolution of each flow's cluster structure. Firstly, various features of a flow are recursively calculated. Secondly, it recursively calculates the flow's evolution characteristics. Finally, it updates the position of the flow's evolution in a self-organizing map.

The evolution comparing component 56 acts to compare the updated evolution with the evolutions of other flows which are within a specific degree of similarity as determined by the self-organizing map. As explained in greater detail below, in some instances the evolution comparing component 56 can receive botnet flow evolutions from other systems like system 30 thereby sharing botnet flow evolutions. When at least two flows' evolutions are found to be similar then those two flows have been identified as botnet flows. Then the identities of the two flows are passed to the remediator component 36. The remediator 36 applies remedies across these identified bots in sequence, e.g. by setting network filters at the vantage point so as to prevent further packets being sent between the pair of computers of the flow. Also, the remediator 36 can share learned botnet evolutions with other botnet identification systems at other vantage points.

Since data accumulates in the memory 58 of the botnet identifier 34, the memory cleaning system 60 removes data relating to older evolutions from the memory 58, once the botnet flow's evolution has been learned, in order to maintain the system in operation.

Figure 3:
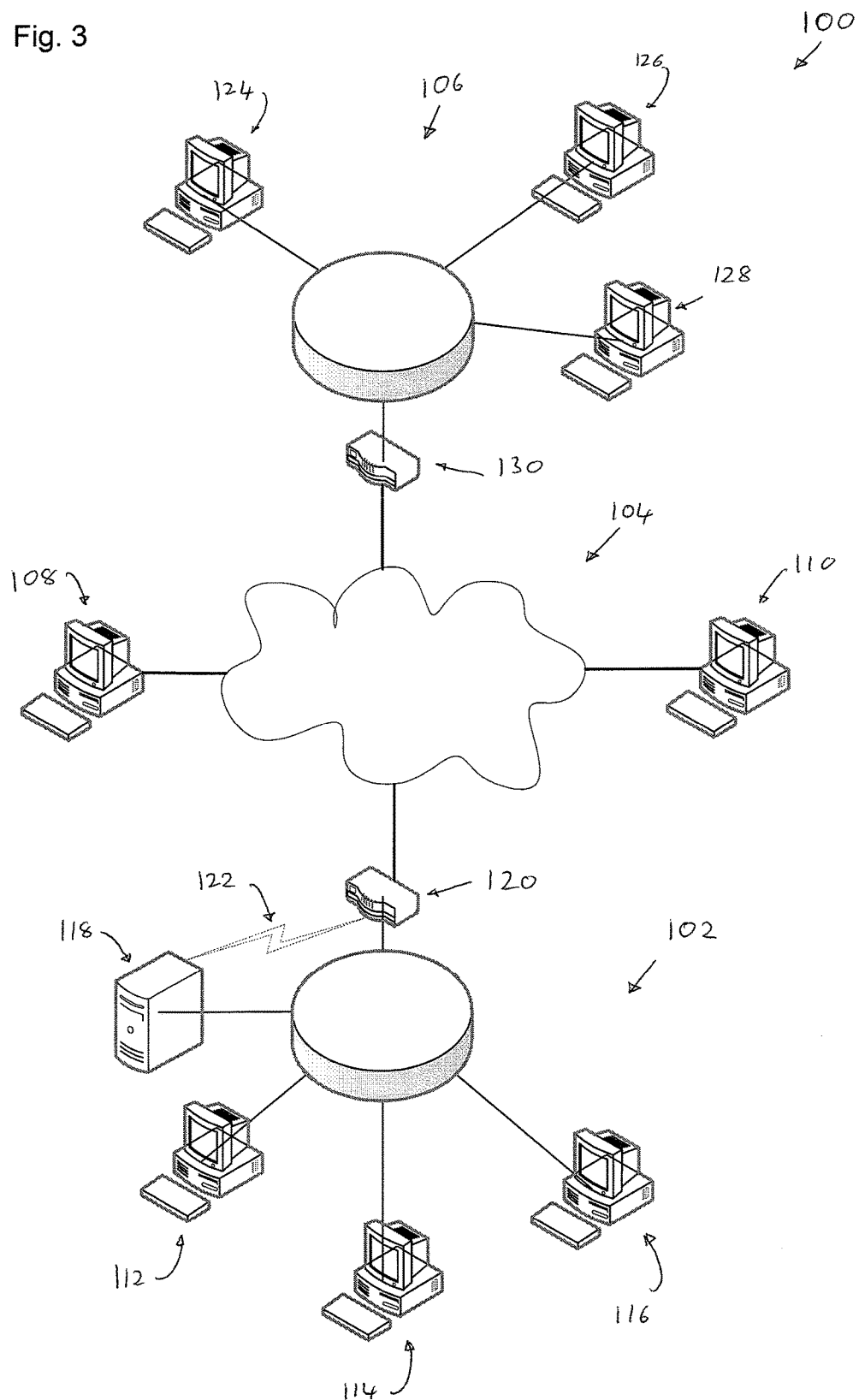
FIG. 3 shows a schematic diagram of a network in which the system and method of the invention can be used.

Example network environments in which the method and data processing apparatus of the invention can be used will now be described. With reference to FIG. 3 there is shown a schematic diagram of a networked computer system 100 in which apparatus and methods according to the invention can be used. The system 100 is itself generally a network and three distinct sub-networks are shown, for the purposes of illustration of the invention. A first sub-network 102 and a second sub-network 106 are each connected to a wider area network 104 which may be, for example, the Internet. As illustrated, wide area network 104 can have multiple computers 108, 110 connected thereto. The first sub-network 102 also has multiple computers connected thereto. In the illustrated embodiment three user computers 112, 114, 116 are present on the sub-network 102. A further data processing device, in the form of server computer 118 is also connected to network 102. A router 120 is also connected to network 102 and provides access to that network and also a connection from sub-network 102 to other networks, including internet 104. Server 118 may communicate with router 120 via the network and/or via a direct communication link 122.

The second sub-network 106 is similar to the first sub-network 102 and similarly includes three end user computers 124, 126, 128 connected via a network which is also in communication with router 130 by which the first sub-network can also communicate with external networks such as the internet 104.

The network which is illustrated in FIG. 3 is intended to be schematic only and to help illustrate the general principles of the invention. It will be appreciated from the following discussion, that the invention is not necessarily limited to a specific network topography. Indeed, the invention can be implemented within a single network in order to manage intra-network communications. The invention is also applicable to communications between computers on different networks in order to manage inter-network communication. Simply as a real world example, sub-network 102 may be a local area network and router 120 simply acts as an access router by which the computers 112, 114, 116 can communicate with external networks. In alternative embodiments, router 120 may be an edge router of an internet service provider (ISP) network 102. Hence, sub-network 102 may vary in scale and configuration ranging all the way from a small local area network up to a very large wide area network which itself has multiple sub-networks.

Further, as illustrated in FIG. 3, network 102 is connected to router 120 which handles communications between the computers on network 102 and external networks. However, router 120 may also act to manage communication between computers 112, 114, 116 on sub-network 102 only. Hence, in some embodiments, router 120 is not necessarily a router but rather is any data processing device capable of handling communications passed between computers 112, 114, 116 over network 102 and able to control those communications.

In the following scenario, it is assumed that computer 108 is a command and control computer of a botnet and that first computer 112 on the first sub-network 102 has been recruited and infected into the botnet. It is also assumed that second 114 and third 116 computers on first sub-network 102 have not been infected and are not part of the botnet. In the example of spam e-mail, command and control computer 108 may issue instructions to first computer 112 over network 104 and 102 instructing computer 112 to send a spam e-mail to all e-mail addresses that first computer 112 has locally available. For example, first computer 112 may have e-mail addresses for computers 114, 116, 124, 126, 128 and 110. Hence, on receipt of the command from computer 108, the first computer 112 sends spam e-mails to computers on both its own local network 102, over the internet and to the computers 124 to 128 on second sub-network 106, which may be, for example, a further ISP network with router 130. The invention can identify traffic passing over the network relating to the spam e-mails as being illegitimate communications, rather than legitimate communications, and may also take action to prevent those illegitimate communications being further transmitted and/or received by the target computers.

Even though computer 108 is part of a botnet, the user may also be transmitting and receiving legitimate communications over the network, for example sending emails, browsing a website, streaming media or download files, and the invention aims to allow legitimate communications to continue while ameliorating illegitimate communications in real-time.

The system 30 may be hosted by server 118, or multiple servers, connected to network 102. Hence, server 118 in FIG. 3 is merely figurative and in reality may represent multiple different servers which may be local or remote to one another. It will be appreciated that in embodiments in which system 30 is realised by multiple servers, that those servers will be in communication with each other either directly or via a suitable network connection. However, for the sake of convenience, herein system 30 will be described as being hosted by server 118 although it will be appreciated that system 30 may also be provided in a distributed fashion. The operation of the components of system 30 will now be described in greater detail.

As described above, a preliminary step involves identifying the set of infected computers that are acting as a host for a botnet. Suitable software for identifying infected host computers includes BotMiner 42 and BotMagnifier 44 as described above and which are hosted by bot identifier component 32. The bot identifying software 42, 44 operating in component 32 on server 118 analyses traffic passing over network 102 to identify infected bot computers which are part of a botnet. In particular, the bot identifying software 42, 44 runs for a substantial period of time, e.g. 24 hours, in order to identify potential botnet hosts. When botnet hosts have been identified, then the IP address and port number for each computer identified as being a bot is passed 38 to the filtering component 50.

Figure 4:
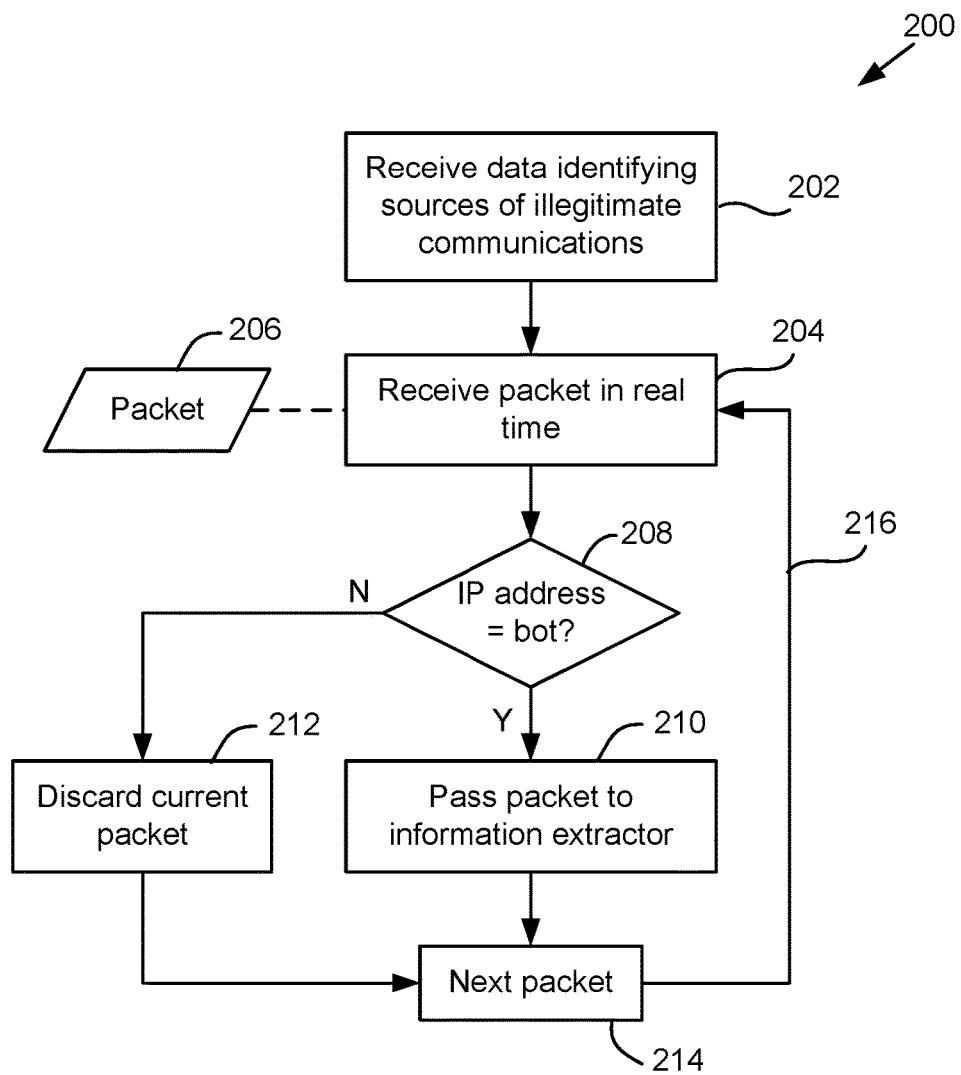
FIG. 4 shows a flow chart illustrating a method of monitoring network traffic as used in the method illustrated in FIG. 1.

FIG. 4 shows a process flow chart illustrating a data processing method 200 carried out by the filtering component 50. At step 202, the filtering component 50 periodically, e.g. every 24 hours, receives data 38 from the bot identifying component 32 which identifies infected bot computers using their IP addresses. Then, in real time, at step 204 individual packets 206, for all packets passing through router 120, are passed by router 120 to the filter component 50. In particular, the router 120 mirrors packets for each and every packet passing through router 120. The filter 50 receives the packet at step 204. Then the filter component 50 effectively filters the received packets using the IP addresses for the identified botnet hosts in order to limit the packets subsequently processed to only those packets sent to or from botnet hosts.

At step 208, the filter determines, using the botnet host IP addresses passed by the bot identifier 32, whether a current packet was sent to or from a botnet host by comparing the source and destination IP addresses for the current packet with a list of IP addresses for bot host computers. If the current packet is not from or to a bot computer, then processing proceeds to step 212 at which the current packet is discarded. Otherwise, processing proceeds to step 210 and the packet is passed to the information extractor component 52. A next packet is then selected for filtering at step 214 and processing returns, as illustrated by process flow line 216 to step 204.

Figure 5:
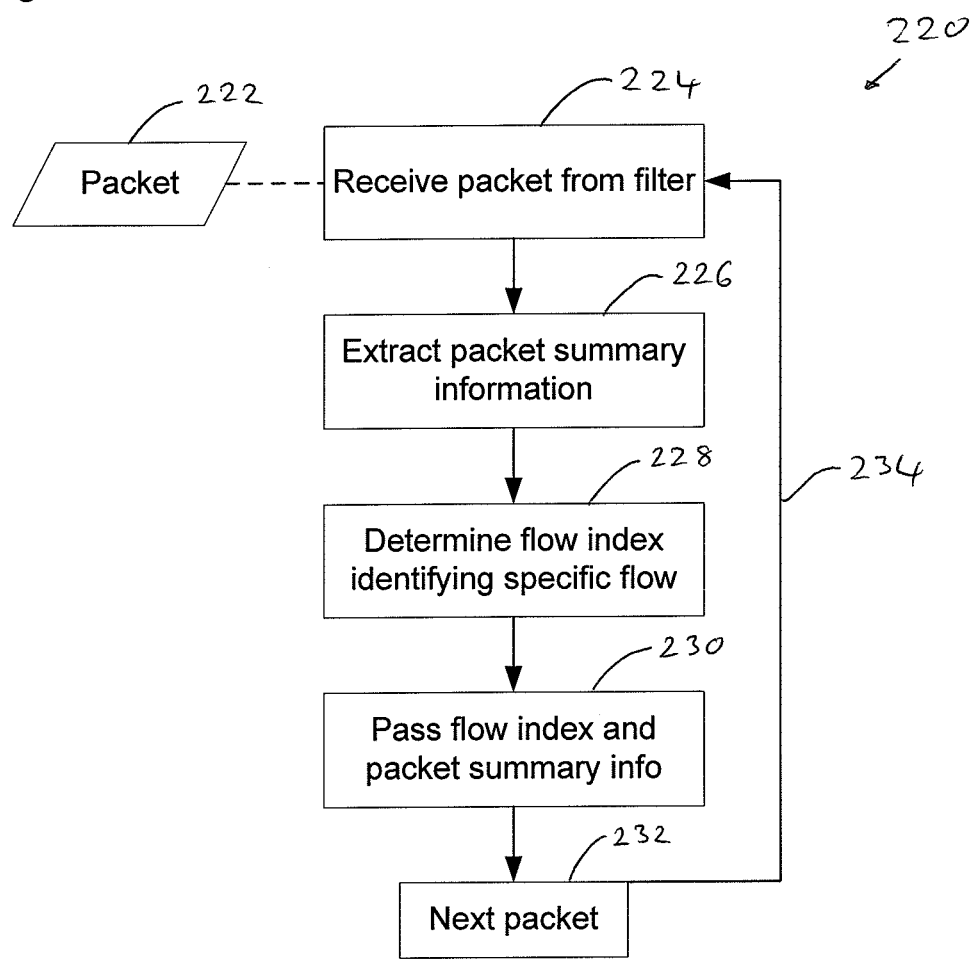
FIG. 5 shows a flow chart illustrating a method of extracting packet information as used in the method illustrated in FIG. 1.

FIG. 5 shows a process flow chart illustrating a data processing method 220 carried out by the information extractor component 52. The information extractor component 50 receives a current packet 222 from the filter 50 at step 224 and then obtains packet summary information for that packet at step 226. The packet summary information can include the size of the packet, the source IP address, the destination IP address and the time stamp of the time of receipt of the packet at router 120. At step 228 the extractor determines a flow index which identifies the flow structure for the flow of which the current packet is a part. The flow index can have the form IPaddress1_IPaddress2, in which IPaddress1 is the IP address having the higher integer value out of the source and destination IP addresses and IPaddress2 is the one having the lower integer value. A flow can be identified by a tuple consisting of destination IP address, destination port, source IP address and source port. This can be considered a "transport level flow identifier". However, the flow index determined at step 228 is an "undirected network level flow identifier" as port numbers are not used, and the directional role of each IP address is irrelevant. That is, the direction in which the packet is travelling is not relevant in the invention. Port numbers are excluded from the flow index because transport-level flows can be much shorter lived than network-level flows. A network-level flow will usually consist of several transport-level flows over a longer lifetime. This means that there is a greater likelihood of identifying the flow within its lifetime, and that it provides more information to help avoid false positives. At step 230, the flow index and packet summary information are passed to the flow evolution modelling component 54. Then at step 232, a next packet is selected and processing returns, as illustrated by process flow line 234 to step 224 at which a next packet is received and the method 220 repeats.

Figure 6:
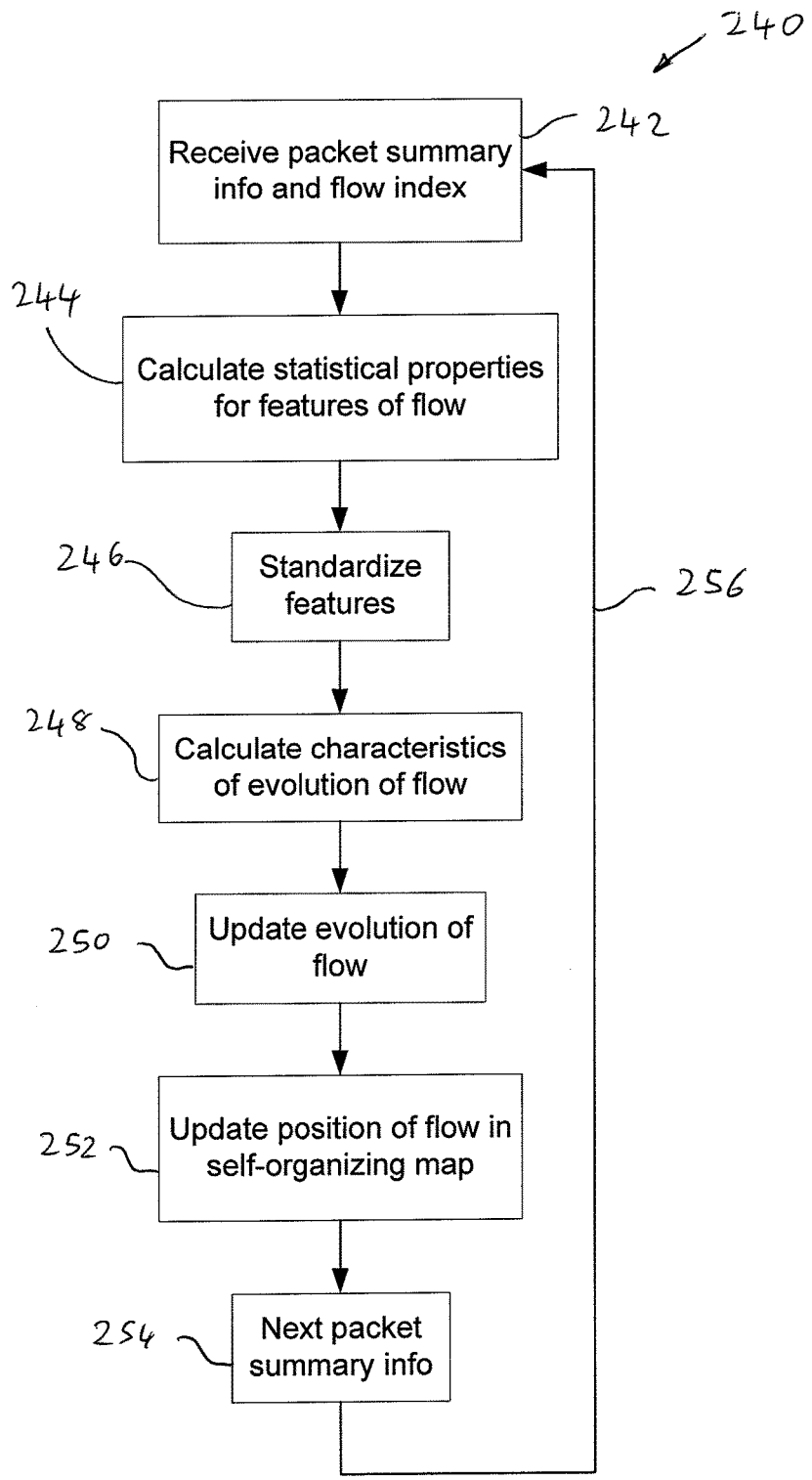
FIG. 6 shows a flow chart illustrating a method of updating the evolution of a data flow as used in the method illustrated in FIG. 1.

FIG. 6 shows a process flow chart illustrating a data processing method 240 carried out by the flow evolution modelling component 54. At step 242, the packet summary information and associated flow index are received from the information extractor 52. Then at step 244 a statistical property of a flow metric (also referred to herein as a flow feature) representing one or more features of the flow is calculated. For example the mean of the flow metric can be calculated. A recursive calculation approach is adopted and at step 246 the flow metrics are standardized to avoid disproportionate weightings being given to the different features. At step 248, the evolution of the flow is characterised using an approach based on the clustering of the flow metrics. In particular at steps 248 and 250 a recursive clustering algorithm, similar to that described in P Angelov, An Approach for Fuzzy Rule-base Adaptation using On-line Clustering, International Journal of Approximate Reasoning, Vol. 35, No 3, pp. 275-289, March 2004 and International Patent Application Publication no WO2008/053161, both incorporated by reference herein in their entirety for all purposes, is used to characterise the evolution of the flow. At step 250, the evolution of the flow is updated to reflect the evolution of the flow as new packets for the flow index of this flow are received. As described in greater detail below a set of clusters which represent the evolution of the flow change as the statistical properties for the features of the flow are updated by newly arriving packets of the flow. At step 252, the position of the evolution of the current flow in a self-organizing map of all of the flows is updated to reflect any evolution of the flow. Then at step 254, packet summary information and an associated flow index for a next packet are selected for processing and processing returns to step 242, as illustrated by process flow line 256, and the method 240 repeats. In the next loop, the packet summary information may be for a different flow or the same flow as determined by the flow index.

In greater detail, at step 244, a flow metric including two features of the current flow is used, namely the bytes per time unit and the bytes per packet. It will be appreciated that the flow metric can use other features which characterise the flow. The statistical properties of these flow features that are calculated for each of them are their mean and their standard deviation. These statistical properties are calculated recursively as described below. The mean bytes per time unit can be calculated by recording an initial time index (being the time stamp for the first received packet for the flow) and maintain a sum of the total number of transferred bytes up to a time stamp of a most recently received packet of the flow. The mean is then calculated by dividing the current total number of bytes by the time period between the initial time stamp and the time stamp for the most recently received packet. The mean bytes per packet can be calculated by recording the number of transferred packets for the flow, and dividing the total number of transferred bytes by the number of packets.

The means of these two flow features are particularly suitable as the statistical property can be calculated recursively and experimental results using only these two flow features have shown very low false positive and negative rates. While the mean of these flow features can be sufficient, in other embodiments other statistical properties of these flow features may also be used such as these flow features' standard deviations or variances as additional features, as these statistical properties can also be calculated recursively according to equation (2) below.

A flow can be represented by a flow metric including a number of flow features and in this instance two flow features are used, bytes per unit time and bytes per packet. These two flow features can be considered to be two components of a vector which represents the 'state' of the flow in a two-dimensional feature space defined by the two features, bytes per unit time and bytes per packet.

At step 244, the mean $\bar{f}_j(k)$ and the standard deviation $s_j(k)$ for each feature $f_j$ of the vector f are recursively calculated using:

$$\bar{f}_j(k) = \frac{k-1}{k} \bar{f}_j(k-1) + \frac{1}{k} f_j(k) \quad (1)$$

$$s_j^2(k) = \frac{k-1}{k} s_j^2(k-1) + \frac{1}{k}(f_j(k) - \bar{f}_j(k))^2 \quad (2)$$

with initial values $\bar{f}_j(1)=f_j(1)$ and $s_j^2(1)=0$. Hence at step 244 statistical properties (the mean and standard deviation) of the flow features have been recursively calculated. Then at step 246, the mean of the flow features is standardized using equation (3) at the $k^{th}$ step.

$$f_s(k) = \frac{f_j(k) - \bar{f}_j(k)}{s_j(k)} \quad (3)$$

The equations from P. Angelov and D. Filev, "Simpl_eTS: A Simplified Method for Learning Evolving Takagi-Sugeno Fuzzy Models," 14th IEEE International Conference on Fuzzy Systems, 2005 are used. The difference between normalization and standardization is that, by using standardization, it is possible to recursively "normalize" the calculated features.

At steps 248 and 250, a recursive clustering algorithm is applied to the standardized features to characterise the evolution of the network flow. The algorithm used has a number of benefits. It allows the evolution of a flow to be characterised recursively. The flow evolution can be characterised using relatively little information (2.2 clusters per network flow on average). The evolutions of flows at different stages of evolution can be compared. The evolution of network flows can be compared in a computationally lightweight way making the method particularly suitable for high-speed and high-volume networks, particularly when combined with a self-organizing map.

Figure 7:
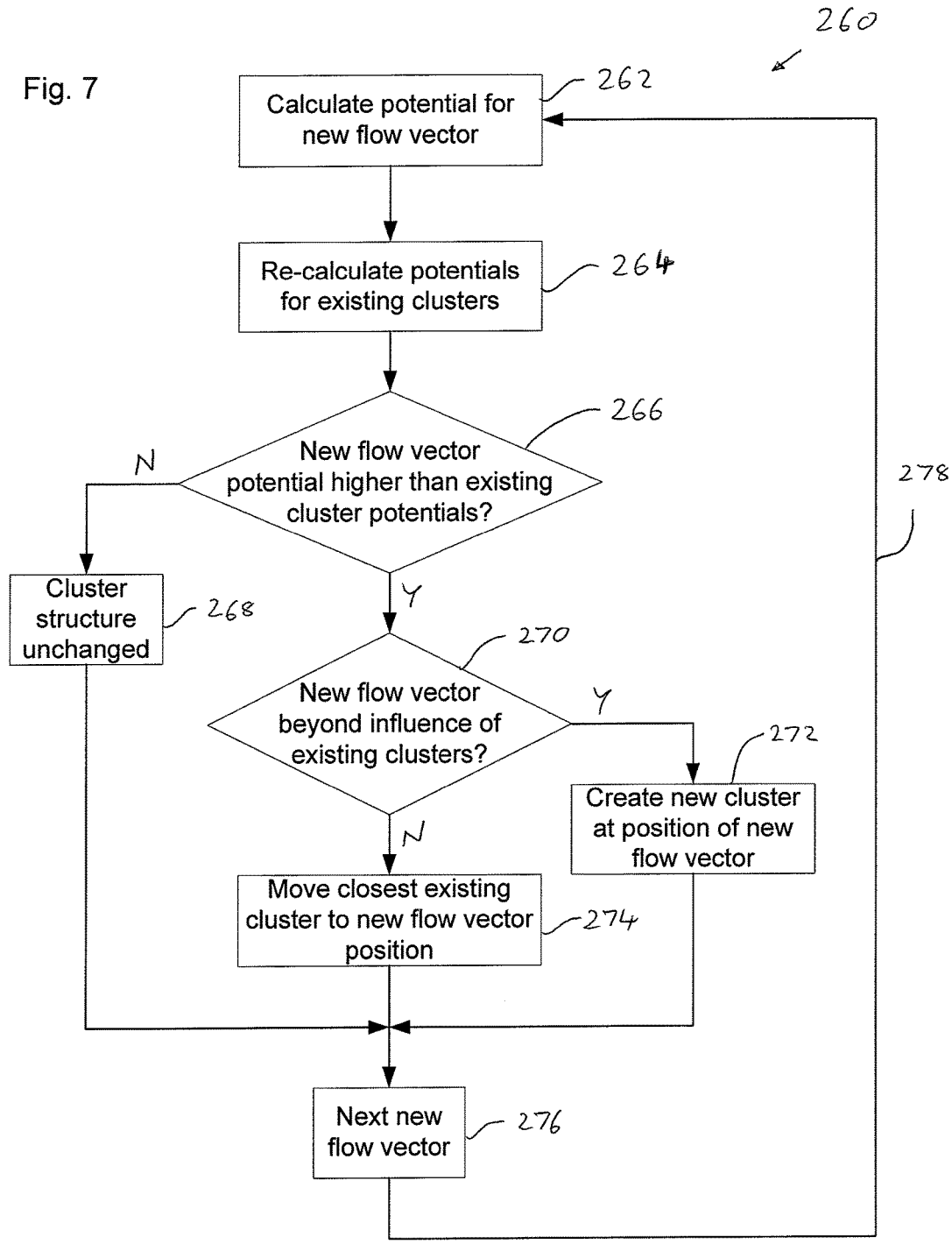
FIG. 7 shows a flow chart illustrating operations to update the evolution of a data flow in greater detail and as used in the method illustrated in FIG. 6.

The clustering algorithm used in steps 248 and 250 is illustrated in greater detail in FIG. 7 which shows a process flow chart illustrating a method 260 of calculating characteristics of evolution of the flow and updating the evolution of the flow. The cluster updating method 260 is applied each time a vector of calculated standardized flow features ("flow vector" below) is available owing to receipt of a new packet for the flow.

Firstly the potential or density in the flow feature space of the new feature vector is calculated at step 262. Secondly at step 264, the potential of any existing cluster is updated. The potential can be thought of as measuring whether the new flow vector brings substantial new information to the evolving cluster structure. The new flow vector can be considered as bringing new information when its potential is higher than the potentials of all existing clusters as determined at step 266.

The equations of the cluster algorithm described in P. Angelov, "An Approach for Fuzzy Rule-based Adaptation Using On-line Clustering," International Journal of Approximate Reasoning, 35(5), 275-289, 2004 and WO 2008/053161 are adapted in order to fit with application in this domain Firstly, the output at the $k^{th}$ step is excluded from the recursive equations for calculating the potential of the new flow vector at step 262 and re-calculating the potentials of existing clusters at step 264 (whereas an output, e.g. temperature, can be measured when the cluster algorithm approach is applied to industrial systems) before any correlated network flows are identified. Thus, the equation for recursively calculating the potential of the new flow vector at step 262 is:

$$P_k(f_k) = \frac{k-1}{(k-1)(v_k+1) + s_k - 2u_k} \quad (4)$$

where $P_k(f_k)$ denotes the potential of the $k^{th}$ input vector calculated at time k, where k=2, 3, . . . , and where $$v_k = \sum_{j=1}^{i}(f_k^j)^2; u_k = \sum_{j=1}^{i} f_k^j B_k^j; B_k^j = \sum_{l=1}^{k-1} f_l^j,$$

and i is the number of features. The parameters $B_k^j$ and $s_k$ are recursively updated using $$s_k = s_{k-1} + \sum_{j=1}^{i}(f_{k-1}^j)^2$$

and $B_k^j = B_{k-1}^j + f_{k-1}^j$. The equation used at step 264 for recursively updating the potential of existing clusters is:

$$P_k(\hat{f}_k) = \frac{(k-1)P_{k-1}(\hat{f}_k)}{k - 2 + P_{k-1}(\hat{f}_k) + P_{k-1}(\hat{f}_k)\sum_{j=1}^{i}(d_{k(k-1)}^j)^2} \quad (5)$$

where $P_k(\hat{f}_k)$ is the potential of the $k^{th}$ step of the cluster centre of the $\hat{f}_k$ input vector, and d is the distance between the new flow vector and the cluster centre being updated considering the $j^{th}$ feature.

At step 266, it is determined, based on the calculated potentials, whether the new flow vector brings substantial new information to the flow structure. This is done by determining whether the potential for the new flow vector is higher than the re-calculated potential for each of the existing clusters. This can be done using a simple a comparison of their relative size.

One of three actions can occur after the determination at step 266 in relation to the evolving cluster structure. If it is determined at step 266 that the potential of the new flow vector is less than the potential for all existing clusters, then processing proceeds to step 268 and no change is made to the cluster structure as the new flow vector does not bring substantial new information to the flow evolution.

If it is determined at step 266 that the potential of the new flow vector is greater than the potential for any of the existing clusters, then processing proceeds to step 270. At step 270 it is determined whether to create a new cluster or whether to move an existing cluster. The equation used at step 270 to decide whether to create a new cluster or to move the closest cluster is also modified from that described in the incorporated references as it is necessary to be able to process large volumes of network traffic. Large volumes of network traffic can generate a large number of close, overlapping clusters, which can make evolution comparison difficult. The condition for deciding what action to apply to the evolving cluster structure at step 270 is:

$$\min_{c=1}^{C}\|f_k - f_c\| < DT \quad (6)$$

where C is the number of existing clusters, and DT is the distance threshold and can, for example, have a value of 0.7.

If it is determined at step 270, using equation (6), that the new flow vector is beyond the influence of a closest existing cluster then processing proceeds to step 272 and a new cluster is created at the position of the new flow vector. If it is determined at step 270 that the new flow vector is within the influence of a closest existing cluster then position of the existing, closest cluster is moved to the position of the new flow vector at step 274. Then following step 268, 272 or 274, a next new flow vector is selected and processing returns to step 262 as illustrated by process flow return line 278.

Figure 8:
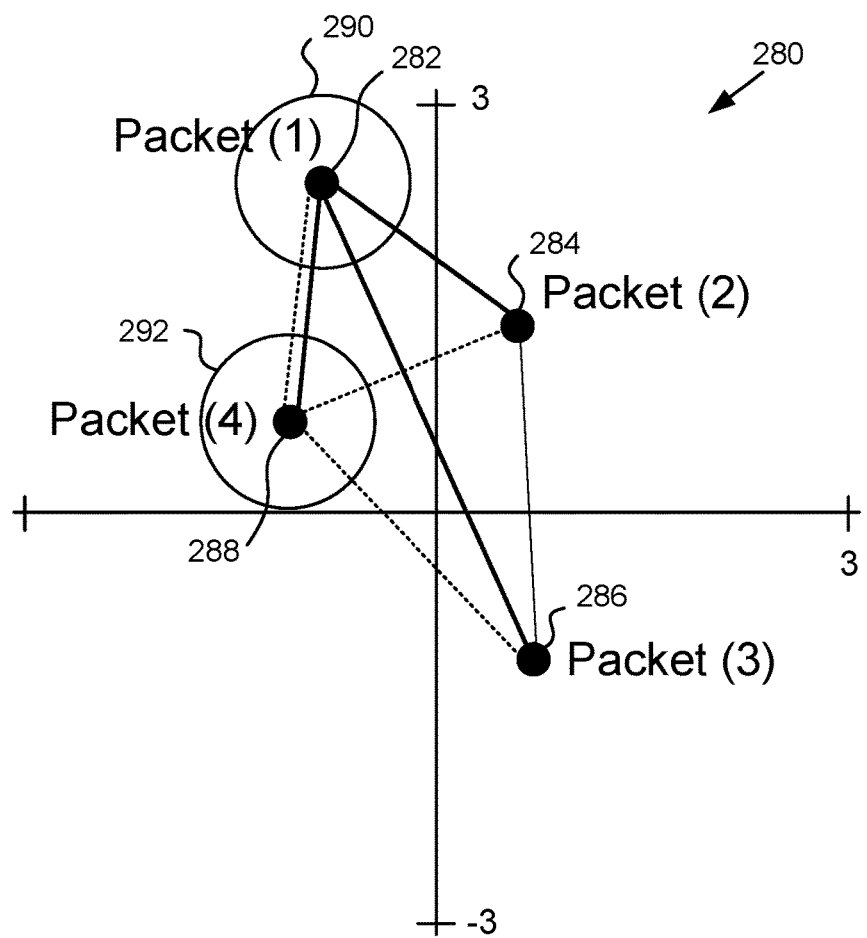
FIG. 8 is a pictorial representation of a flow feature space and illustrating the updating of a cluster structure representing the evolution of a data flow.

The recursive cluster updating algorithm 260 will be further described with reference to FIG. 8. FIG. 8 shows a pictorial representation of a 2-dimensional flow feature space 280 and the effect of four flow feature vectors for packets one to four relating to a specific flow index. The points 282, 284, 286 and 288 represent the positions in the flow feature space of the flow feature vectors for each of packets one to four respectively. The various lines between the points 282, 284, 286 and 288 illustrate the distance in feature space between each point. Circle 290 illustrates the size or zone of influence of a first cluster centred on the position of point 282 corresponding to the first packet. Each cluster has a quality measure called its support (as defined by equation 8 below), which is the number of flow feature vectors taken over by that cluster at the current time of the evolution of the flow.

Taking the example of an evolving cluster structure as illustrated in FIG. 8. If packet 4 is the current packet, then at step 262 its potential is calculated and at step 264 the potential of the one existing cluster 290 is re-calculated. At step 266, it is determined that the fourth packet brings new information about the evolution of the flow and results in a change of the evolution of the cluster structure representing the network flow because the sum of distances between its centre 288 and each of the others (282, 284 & 286) is less than the sum of distances between the centre 282 of the first cluster 290 and each of the others (284, 286 & 288). That means the potential or density for the new flow vector position 288 is higher. Therefore processing proceeds to step 270 and it is determined whether the new flow vector is beyond the zone of influence of the first cluster or not. If so a new cluster 292 is created at the position of the new flow vector 288 at step 272. Otherwise, the first cluster 290 would be moved to the position of the new flow vector 288 at step 274.

Figure 9:
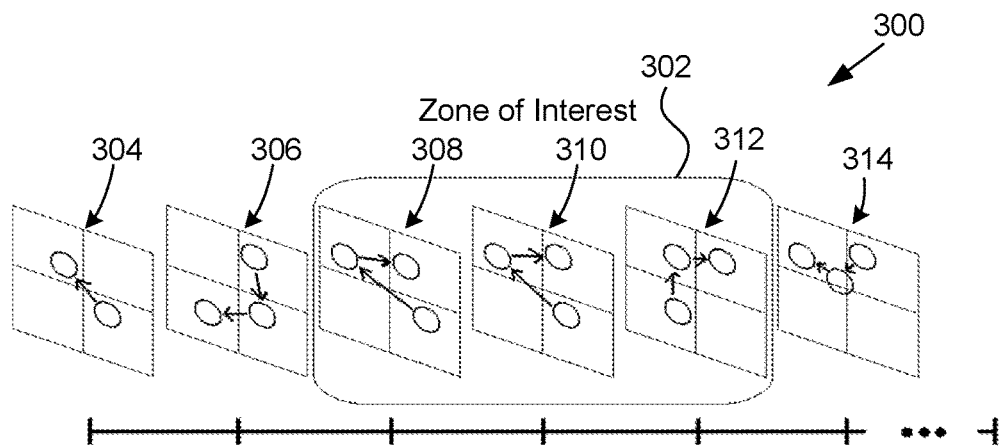
FIG. 9 is a pictorial representation of a self-organizing map of cluster structures representing flow evolutions for a plurality of different data flows.

Returning to FIG. 6, once the evolution of the flow has been updated at step 250, then processing proceeds to step 252 at which the position of the flow for the current flow index in a self-organizing map of all flow indices is updated. In particular, a self-organizing map is reorganised, by updating the flow evolution's position in the map so that it is closer to roughly similar flow evolutions in the map. FIG. 9 illustrates pictorially the use of a self-organizing map 300 to conduct the search for similar flow evolutions. A comparison of flow evolutions is subsequently carried out only for those flows within a certain 'zone of interest' 302 (i.e. degree of similarity to a currently selected flow). This helps to achieve an almost constant-time look-up which provides significant scalability for the method.

The cluster structure 304, 306, 308, 310, 312 & 314 for each flow index has a rough identifier, which is computed from the flow evolution's cluster properties using the equation:

$$I = \sum_{c=1}^{C} \prod_{j=1}^{i} f_c^j \quad (7)$$

where I denotes the rough identifier, where f is as defined above in equation (3) and C is defined above with reference to equation (6). Flows having similar evolutions are likely to have a similar rough identifier.

The cluster structures are arranged in the self-organizing map by order of their rough identifier, and each cluster structure is repositioned within the self-organising map by a binary search when its rough identifier changes as a result of a change to its cluster structure. The search is truncated when the cluster structure's rough identifier differs from the rough identifier of a cluster structure at a candidate position by less than a configured threshold, such as 0.1%. Exceptionally, when an evolving cluster structure is first created, it is positioned at the beginning of the self-organizing map.

Kohonen, T., "The Self-Organizing Map", Proceedings of the IEEE 79, 9, (1990), pages 1464-1480, describes the principles of self-organizing maps and the application of self-organizing maps to this part of the invention will be apparent to a person of ordinary skill in the art from the description thereof herein.

Returning to FIG. 1, when a flow's evolution changes, then at step 18, the comparer 56 determines whether the evolution of the flow under consideration is correlated with other observed flow evolutions generated by other bots on the network. The comparer 56 compares a current flow's evolution with other flow evolutions within a zone of interest 302 as defined in the self-organizing map 300. Generally speaking, if the current flow evolution is found to be evolving similarly to at least one other flow evolution, then the two flows can be considered to have been identified as both corresponding to bot net flows of illegitimate traffic which needs to be remediated.

Figure 10A:
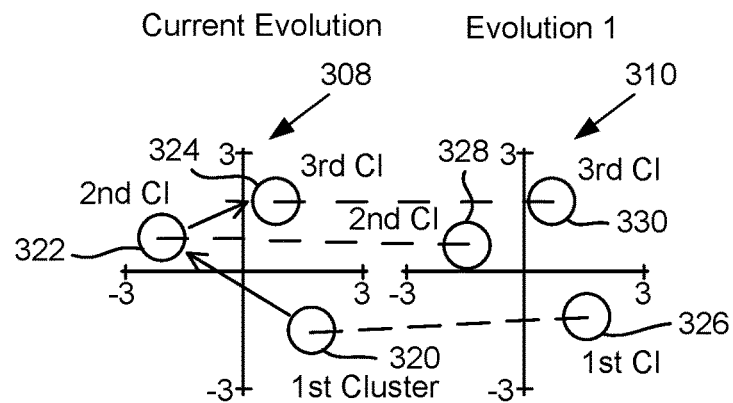
FIGS. 10A and 10B are pictorial representations illustrating the comparison of pairs of cluster structures representing the flow evolution for two different pairs of data flows.
Figure 10B:
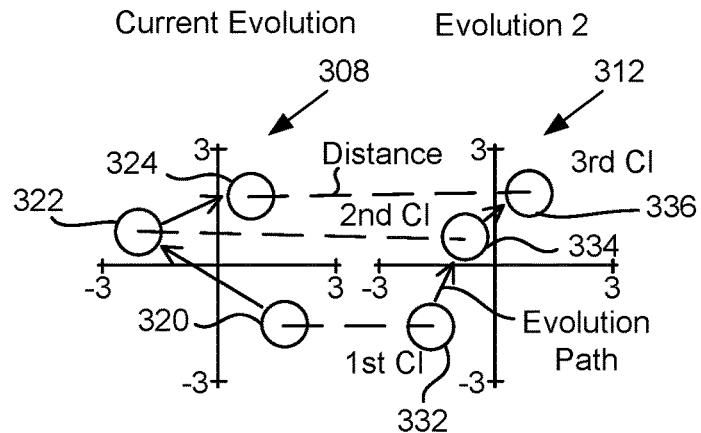
Figure 11:
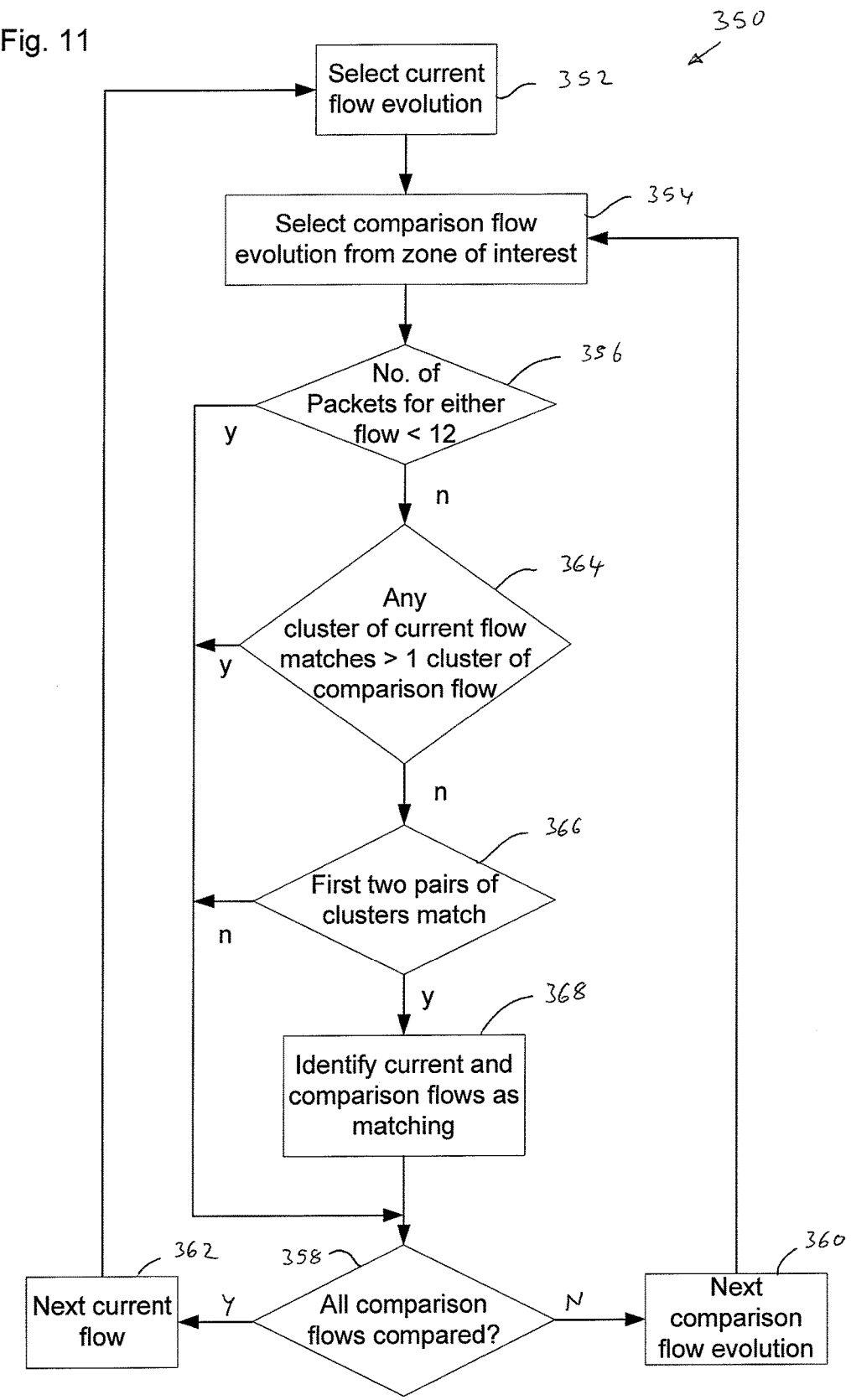
FIG. 11 shows a flow chart illustrating a method of comparing the similarity of flow evolutions as used in the method illustrated in FIG. 1.

FIGS. 10A and 10B pictorially illustrate a method of comparing the similarity of flow evolutions and FIG. 11 shows a flow chart illustrating the method 350 of comparing the similarity of flow evolutions, which corresponds generally to step 18 of FIG. 1. For each flow index, a cluster structure represents the flow evolution. Each cluster structure includes a sequence of clusters in their order of creation. By comparing cluster structures for two flow indices the flow evolutions are compared. To compare two cluster structures, each cluster of a first flow path is compared with its corresponding cluster of a second flow. Two clusters are compared by calculating their distance or separation in the flow feature space, the absolute difference in their support, and the absolute difference in their radius. Thresholds are used for each measure in order to determine whether two compared corresponding clusters match. Example values for the thresholds are a distance threshold of 0.29, a support threshold of 0.55 and a radius threshold of 0.01. The euclidean distance is used for calculating the distance. The process is repeated for each cluster in sequence until either a flow evolution ends, or the flow evolutions have been determined to be dissimilar. Otherwise, the two flow evolutions are determined match once all the rules have been met.

In greater detail, FIG. 10A pictorially illustrates comparing a first cluster structure 308 for a first flow index with a second cluster structure 310 for a second flow index. FIG. 10B pictorially illustrates comparing the first cluster structure 308 for the first flow index with a third cluster structure 312 for a third flow index. Assuming that the first cluster structure 308 is the current one being evaluated, then the comparison method is applied only to other cluster structures already determined to be similar by their proximity to the current cluster structure in the self-organizing map. In other embodiments, in which the self-organizing map is not used, then a current cluster structure is compared with all other cluster structures currently kept in memory.

Cluster structure 308 includes a sequence of three clusters, comprising first 320, second 322 and third 324 clusters which were created in that sequence or order by the clustering algorithm described above. Similarly cluster structure 310 includes a sequence of three clusters, comprising first 326, second 328 and third 330 clusters which were created in that sequence. Also, cluster structure 312 similarly includes a sequence of three clusters, comprising first 332, second 334 and third 336 clusters which were created in that sequence.

A quantity called support can be calculated for each cluster of each flow evolution using equation (8)

$$S^l = S^l + 1 \text{ for } l = \underset{c=1}{\overset{C}{\operatorname{argmin}}} \|f_k - f_c\| \quad (8)$$

where $S^l$ is the support of the $l^{th}$ cluster; $l=[1, C]$.

The radius of a cluster can be recursively calculated using equation (9)

$$r_k^{li} = \rho r_{k-1}^{li} + 1(1-\rho)\sigma_k^{li}; r_1^{li} = 0.5 \quad (9)$$

$$l = \underset{c=1}{\overset{C}{\operatorname{argmin}}} \|f_k - f_c\|$$

where ρ is a learning constant (learning rate). A value of $$\rho = \frac{1}{2}$$

means that the new information is as valuable as the existing one. The value of ρ determines how dynamic the learning is, i.e. how quickly the radius is adapted. A quantity $\sigma_k^{li}$ the local scatter over the flow feature space that resembles the variance. It is possible to recursively calculate σ using Equation (10)

$$(\sigma_k^{li})^2 = \frac{S_k^l - 1}{S_k^l}(\sigma_{k-1}^{li})^2 + \frac{1}{S_k^l}\|f_k^{li} - f_c^{li}\|^2; \quad (10)$$

$$\sigma_0^{li} = 0$$

When a new cluster is added, its local scatter is initialized based on the average of the local scatters of the existing clusters. These equations for recursively calculating the support and the radius are adopted from P. Angelov, "Evolving Takagi-Sugeno Fuzzy Systems from Data Streams (eTS+)", in Evolving Intelligent Systems: Methodology and Applications (P. Angelov, D. Filev, N. Kasabov Eds.), Wiley, pp. 21-50, ISBN: 978-0-470-28719-4, April 2010, which is incorporated herein by reference in its entirety for all purposes.

With reference to FIG. 11, at step 352 a current flow evolution, e.g. 308, is selected for comparison with other flow evolutions ("comparison flow evolutions") and at step 354 a first of the comparison flow evolutions, e.g. 310, is selected. A number of rules are applied by the method 350 in order to compare the flow evolutions to identify matching flow evolutions. These rules are selected in order to help reduce false positive matches and false negative matches. A first rule is applied at step 356. If either flow evolution has fewer than a threshold number of packets contributing to it then the comparison for that pair of flow evolutions is terminated. This is because some flow evolutions may appear to evolve similarly in their early stages, but become distinct after a sufficient number of contributing packets have been transmitted. It has been found that a suitable threshold to achieve very low false positive rates is to constrain the comparison to flow evolutions which each have at least 12 contributing packets.

Hence, if it is determined at step 356 that either flow evolution 308 or 310 has fewer than 12 contributing packets, then processing proceeds to step 358 at which it is determined whether all comparison flow evolutions have been compared with the current flow evolution 308. If not, then processing proceeds to step 360 and a next comparison flow evolution is determined, e.g. 312, and processing returns to step 354. Alternatively, at step 358, processing can proceed to step 362 and a next current flow evolution, e.g. flow evolution 310 is selected for comparison with other comparison flow evolutions, e.g. flow evolution 312. It will be appreciated that the comparison of flow evolutions only needs to be conducted for each unique pair of flow evolutions such that once flow evolution 308 has been compared with flow evolution 310, there is no need also to compare flow evolution 310 with flow evolution 308.

A second rule is applied at step 364. A pair of flow evolutions can be considered not to match if there is a duplicate overlap between the flow evolutions. This happens when any cluster of the first flow evolution is determined to match at least two clusters of the other flow evolution, based on the similarity of cluster position, cluster support and cluster radius as described above. If at step 364 it is determined that any cluster of the current flow evolution matches more than one cluster of the comparison flow evolution, the processing proceeds to step 358 and continues as described above. Otherwise processing proceeds to step 366.

At step 366 a third rule is applied. The third rule determines whether at least the first two pairs of clusters match. This rule helps to achieve very low false negative rates. This rule is based on the sequence in which clusters occur and helps distinguish between evolution flows which have similar cluster arrangements, but whose clusters were generated in a different order and hence evolved differently. If at step 366 it is determined that either the first or second pairs of clusters of the flow evolutions do not match, then processing proceeds to step 358 and continues as described above. Otherwise processing proceeds to step 368 and the current flow evolution and comparison flow evolution can be identified or determined as matching, before processing proceeds to step 358 and continues as described above. Once a pair of flow evolutions has been identified as matching at step 368, then data identifying the pair of computers for each of the flows can be output to the remediator 36 for remediation of the data flow between the computers over the network action at step 20.

It will be appreciated that other rules can be used and that other parameters can be used in the rules depending on the number of false negatives and false positives that may be acceptable in any given application.

The application of flow evolution comparison method 350 to different pairs of cluster structures will be described with reference to FIGS. 10A 10B, 12A and 12B. It is assumed that each flow evolution comprises more than 12 packets and so the first test at step 356 is passed. As illustrated in FIG. 10A, the first cluster 320 of the current flow evolution matches only the first cluster 326 of the comparison flow evolution, and similarly for the pairs of second 322, 328 and third 324, 330 clusters. Hence the second test at step 364 is passed. Further the pair of first clusters 320, 326 and the pair of second clusters 322, 328 are determined to match and hence the third test at step 366 is passed. Therefore, at step 368, the flow evolution represented by cluster structure 308 is identified as matching the flow evolution represented by cluster structure 310. Hence, the pair of computers for each of the flow evolutions can be considered as exhibiting network traffic corresponding to botnet behaviour and hence have been identified as part of a botnet causing illegitimate network traffic and so remediation action can be taken to deal with this illegitimate network traffic.

As illustrated in FIG. 10B, the first cluster 320 of the current flow 308 does not match the first cluster 332 of the comparison flow evolution 312 as the separation of the cluster centres is too great. However, the pairs of second 322, 334 and third 324, 336 clusters uniquely match. The second test at step 364 is passed as there is no duplicate matching. However, as the pair of first clusters 320, 332 are determined not to match, the third test is failed at step 366. Therefore, step 368 is bypassed and the flow evolution represented by cluster structure 308 is not identified as matching the flow evolution represented by cluster structure 312. Hence, the pair of computers for each of the flow evolutions are not considered as exhibiting botnet behaviour even though at least one of the computers in each pair is a bot. This may be because the network traffic is legitimate, e.g. corresponds to a user sending email, browsing a website or transferring a file. Therefore, no remediation action should be taken so as not to interrupt this legitimate network traffic.

Figure 12:
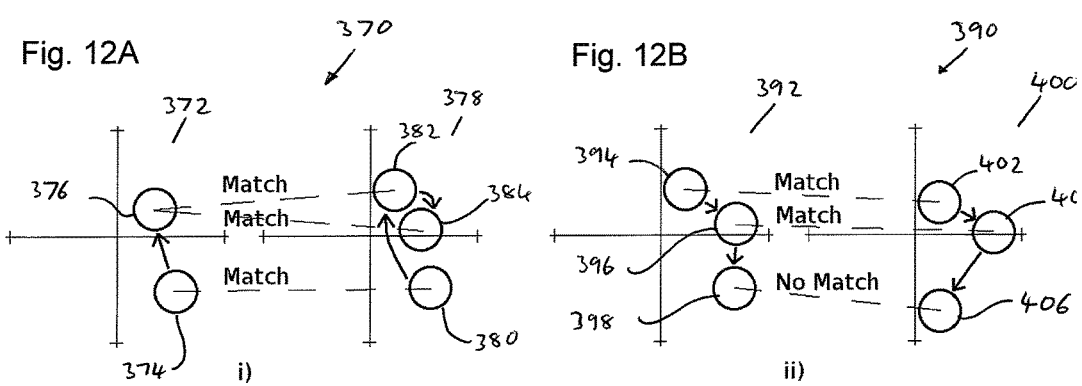
FIGS. 12A and 12B are pictorial representations illustrating the tests used in the method of FIG. 11 to determine the similarity of two different pairs of flow evolutions.

FIG. 12A shows a pictorial representation 370 of a first cluster structure 372, having a first cluster 374 and a second cluster 376 (and in which the arrow linking them shows the order of cluster creation). FIG. 12A also shows a second cluster structure 378, having a first cluster 380, a second cluster 382 and a third cluster 384. As illustrated, a unique match is determined between the pair of first clusters 374, 380. However, second cluster 376 is determined to match (based on all of cluster separation, cluster support and cluster radius) both the second cluster 382 and the third cluster 384 of the second cluster structure 378. Hence, the second test at step 364 is not passed and step 368 is bypassed and the flow evolutions represented by cluster structures 372 and 378 are not identified as matching.

FIG. 12B shows a pictorial representation 390 of a first cluster structure 392, having a first cluster 394, a second cluster 396 and third cluster 398. FIG. 12A also shows a second cluster structure 400, having a first cluster 402, a second cluster 404 and a third cluster 406. As illustrated, a unique match is determined between the pair of first clusters 394, 402, pair of second clusters 396, 404, but no match between the pair of third clusters 398, 406, for example, because of the separation of their cluster centres. Hence, the second test at step 364 is passed as there are no duplicate cluster matches. Also, even though the third pair of clusters do not match, the first pair of clusters and second pair of clusters do match and hence the third test at step 366 is also passed. Therefore the flow evolutions represented by cluster structures 392 and 400 are identified as matching.

Returning to FIG. 1, once a pair of network flows have been identified at step 18 as corresponding to illegitimate network traffic then remediation can be carried out at step 20.

A command is issued by the server 118 to router 120 in order to remediate the botnet activity. Various remediation mechanism or measures 36 may be implemented by router 120 and a suitable remediation command is issued from server 118 to router 120. The remediation command would include as arguments, the IP address of the destination and/or source computer having been identified as the destination or source of illegitimate communications. The router can enact whatever remediation action was instructed by the received remediation command. A number of remediation strategies may be implemented. For example, router 120 may be instructed to filter out all packets having specified source and destination IP addresses. Hence, for example, if computer 112 is part of the botnet that is trying to send spam to computer 124, then the router 120 may filter out all packets having an IP source address corresponding to computer 112 and an IP destination address corresponding to computer 114. If a user of computer 112 is also trying to send a legitimate e-mail to computer 126, then the router 120 will not filter out packets having the IP source address for computer 112 and IP destination address for computer 126. Hence, the invention prevents the illegitimate communications resulting from the botnet activity but still allows legitimate communications instantiated by the user of computer 112.

In an alternative remediation strategy, error bits may be inserted into data packets by router 120 in order to corrupt the packets being transmitted over the botnet. Hence, while this does not reduce botnet traffic over the network, it will prevent the intended effect of the botnet, for example by corrupting messages being transmitted or by corrupting malware or other software routines that the botnet may be trying to distribute and install over the network.

At step 22 memory cleaning can be carried. It will be appreciated that memory cleaning 22 can be carried out in parallel with or entirely independently from any remediation action and is illustrated as a step subsequent to step 20 in FIG. 1 merely for convenience. The memory cleaning system 60 prevents data accumulated in the bot net identifier component memory 58 from overflowing. Once a pair of flows has been identified as corresponding to illegitimate communications, then data representing the cluster structures for flow evolutions older than flows identified as illegitimate flows can be removed from the self-organizing map 300. Data representing cluster structures for flow evolutions younger than the illegitimate flows are kept in memory 58, as these flows may not yet have had enough time to mature and could later be found to be similar.

In addition, the memory cleaning system 20 can clean data representing cluster structures for flow evolutions from the memory after a certain period of time has expired (defined by a time threshold, such as 1 minute) from when an illegitimate flow has been identified. This helps preventing illegitimate flow evolutions from being mistakenly removed, caused by false positives, that would then affect the performance of the remediation. If, for some reason, legitimate network flows are identified as botnet flows, then this might cause the memory management system to remove botnet flows which have not yet identified as botnet flows, thereby reducing the effectiveness of remediation.

The age of a flow evolution is defined by the age of a cluster representing the flow evolution and having the highest support. The age of a clusters is calculated using $$\text{age}_k^c = k - \bar{I}_k \qquad (11)$$

where c=[1, C], and $I_k$ denotes the time index of the moment when the flow feature vector was read, and $$\bar{I}_k = \frac{1}{M_k^c} \sum_{j=1}^{M_k^c} I_j$$

is the mean time index that is associated with the $c^{th}$ cluster. The equation set out in P. Angelov and R. Yager, "A New Type of Simplified Fuzzy Rule-based Systems," International Journal of General Systems, pp. 1-21, 2011, which is incorporated herein by reference in its entirety for all purposes, is used as it is applicable to larger data sets.

Two of the parameters used in the overall method are particularly tuneable. The method uses: (1) a distance threshold that is used to determine when to create a new cluster or move an existing closest cluster to the position of the new input (as defined by equation 3 above); and (2) a threshold, in terms of the number of clusters created, which defines when to make a decision regarding the nature of a flow, i.e., whether it is botnet-related (see step 366 of FIG. 11 and the discussion thereof above). Based on empirical analysis, with various datasets described, a value around 0.7 for the distance threshold has proved to yield very low false negative rates. For a given network deployment this value could potentially be learned or auto-calibrated. The second parameter can be used to strike a balance between the timeliness of remediation of illegitimate flows, versus remediation accuracy. Similarly, via empirical analysis, it has been determined that a minimum of two clusters achieves very low false positive rates, when using the rules described above for eliminating false positives and negatives.

Results from investigations of the computational scalability of the method indicate that when using the self-organizing map, the method achieves almost constant look up, when comparing the current flow evolution with comparison flow evolutions in the zone of interest. It has been found that botnet flows are roughly similar with a zone of interest range of 1% (i.e. for flow evolutions within the range of approximately 1% of the rough identifier). Hence, instead of comparing the current flow evolution with all flow evolutions currently in memory, the comparison is only carried out for flow evolutions in this small range, thus facilitating light weight recursive computation.

The result from experimentation when the method uses the self-organizing map (and with a zone of interest of 1%) indicates that the method is applicable to high speed and high volume networks. However, the method can still have application without using the self-organizing map, and in such approaches specialized hardware support may be needed in order to be able to perform the remediation in real-time. Alternatively, the method can be applied to lower speed and/or lower volume networks.

In some practical applications of the method, the use of proxies, and network address translation (NAT) may represent potential obstacles. However, in order to gain real-time control over botnet traffic coming from enterprise networks behind proxies, and NATs, the method can use shared learned illegitimate flow evolutions 59. For example a first system can learn the illegitimate flow evolution and then broadcasts it to other instances of the system in ISP networks. These other instances of the system can use the shared flow evolutions 59 to determine flow evolution matches. Then newly discovered pairs of IP addresses (which potentially may be anonymised) can be further broadcast to improve the visibility and control over botnet networks on the Internet.

Specifically for botnets, several cases may occur. For a centralized botnet, the situation is straightforward. The learned botnet destination can be broadcast to other remediation mechanisms in ISP networks which can then terminate flows to the destination of the centralized botnet. For peer-to-peer (P2P) or hybrid botnets, instances of the system 30 in ISP networks can use the shared botnet flow evolutions, since these system instances 30 may already be monitoring traffic coming from bots from certain enterprise networks behind proxies, or NATs, if the bot(s) is/are visible to these system instances, but they cannot themselves carry out remediation, since they have not been identified as bot nets with certainty. The most difficult case is when n evolutions are merged into one. This may be caused by n bots with the same botnet destination. An instance of the system 30 in a ISP network needs to "shape" the network traffic in such a way as to generate n variations of evolutions if this is possible for the system instance. Then, such a system instance can also broadcast n variations of flow evolutions to other system instances in ISP networks in order to be able to gain real-time control over botnet traffic coming from enterprises behind proxies, or NATs. In addition, using shared flow evolutions 59 may also assist in confirmation of the results generated by individual system instances 30 across ISP networks and the building of a common knowledge base.

Hence, it will be appreciated that the invention provides a valuable tool in being able to identify illegitimate communication between computers over a network. The method uses packet summary data in order to determine the similarity of data flows between different pairs of computers and therefore does not need to inspect the actual payload of the packets. It is therefore particularly suitable for providing real time identification and remediation of illegitimate communications. Various flow features representing the data packets transmitted can be used in order to characterise the data flows. For example, the flow features used in the described embodiment are based on the number of packets transmitted within a certain time period and the number of bytes of data transmitted by those packets. However, flow features defined by other attributes of the packets may also be used. Further, although a cluster based approach to identifying similarly evolving patterns of data flow has been described, other techniques for assessing similarity of data flow evolution can be used.

Generally, embodiments of the present invention, and in particular the processes involved in the identification and remediation of illegitimate network communications employ various processes involving data stored in or transferred through one or more computer systems. Embodiments of the present invention also relate to an apparatus, which may include one or more individual devices, for performing these operations. This apparatus may be specially constructed for the required purposes, or it may be a general-purpose computer or data processing device, or devices, selectively activated or reconfigured by a computer program and/or data structure stored in the computer or devices. The processes presented herein are not inherently related to any particular computer or other apparatus. In particular, various general-purpose machines may be used with programs written in accordance with the teachings herein, or it may be more convenient to construct a more specialized apparatus to perform the required method steps. A particular structure for a variety of these machines will appear from the description given below.

In addition, embodiments of the present invention relate to computer readable media or computer program products that include program instructions and/or data (including data structures) for performing various computer-implemented operations. Examples of computer-readable media include, but are not limited to, magnetic media such as hard disks, floppy disks, and magnetic tape; optical media such as CD-ROM disks; magneto-optical media; semiconductor memory devices, and hardware devices that are specially configured to store and perform program instructions, such as read-only memory devices (ROM) and random access memory (RAM). The data and program instructions of this invention may also be embodied on a carrier wave or other transport medium. Examples of program instructions include both machine code, such as produced by a compiler, and files containing higher level code that may be executed by the computer using an interpreter.

Figure 13:
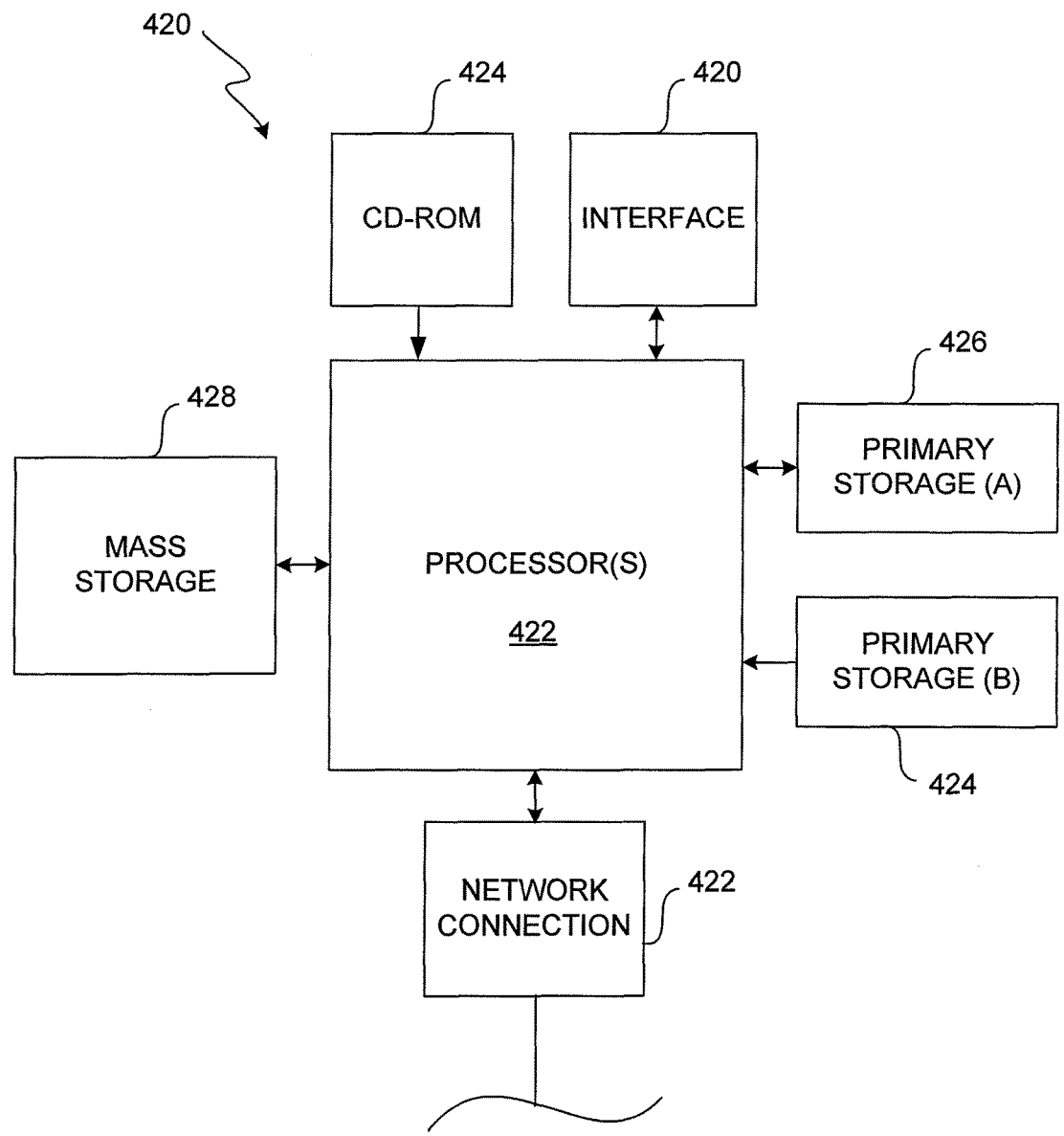
FIG. 13 shows a schematic block diagram of a data processing device according to the invention.

FIG. 13 illustrates a typical computer system that, when appropriately configured or designed, can serve as an apparatus of this invention. The computer system 430 includes any number of processors 422 (also referred to as central processing units, or CPUs) that are coupled to storage devices including primary storage 426 (typically a random access memory, or RAM), primary storage 424 (typically a read only memory, or ROM). CPU 422 may be of various types including microcontrollers and microprocessors such as programmable devices (e.g., CPLDs and FPGAs) and unprogrammable devices such as gate array ASICs or general purpose microprocessors. As is well known in the art, primary storage 424 acts to transfer data and instructions uni-directionally to the CPU and primary storage 426 is used typically to transfer data and instructions in a bi-directional manner. Both of these primary storage devices may include any suitable computer-readable media such as those described above. A mass storage device 428 is also coupled bi-directionally to CPU 422 and provides additional data storage capacity and may include any of the computer-readable media described above. Mass storage device 428 may be used to store programs, data and the like and is typically a secondary storage medium such as a hard disk. It will be appreciated that the information retained within the mass storage device 428, may, in appropriate cases, be incorporated in standard fashion as part of primary storage 426 as virtual memory. A specific mass storage device such as a CD-ROM 424 may also pass data uni-directionally to the CPU.

CPU 422 is also coupled to an interface 420 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 422 optionally may be coupled to an external device such as a database or a computer or telecommunications network using an external connection as shown generally at 422. With such a connection, it is contemplated that the CPU might receive information from the network, or might output information to the network in the course of performing the method steps described herein.

Although the above has generally described the present invention according to specific processes and apparatus, the present invention has a much broader range of applicability. In particular, aspects of the present invention are not limited to identifying and remediating only botnets and can be applied to virtually any communication between computers over a network where patterns in data flow between the computers can be used to identify coordinated behaviour which may, in particular, be illegitimate or unwanted behaviour. One of ordinary skill in the art would recognize other variants, modifications and alternatives in light of the foregoing discussion.

The invention claimed is:

1. A real-time method of identifying similar and coordinated communications between a plurality of computers connected by a network, the method comprising:
monitoring communications between a plurality of pairs of computers over the network to obtain a first flow metric for a first pair of computers and a second flow metric for a second pair of computers, wherein the first flow metric represents at least one property of a first data flow between the first pair of computers and the second flow metric represents at least one property of a second data flow between the second pair of computers;
updating a representation of the evolution of the first data flow between the first pair of computers using the first flow metric or updating a representation of the evolution of the second data flow between the second pair of computers using the second flow metric;
comparing the representation of the evolution of the first data flow and the representation of the evolution of the second data flow to determine the similarity of the first data flow and the second data flow; and
identifying the first pair of computers and the second pair of computers as exhibiting similar and coordinated communication if the first data flow and second data flow are determined to be similar.

2. The method of claim 1, wherein the flow metric includes the average number of bytes per unit time transmitted between the pair of computers.

3. The method of claim 1, wherein the flow metric includes the average number of bytes per packet transmitted between the pair of computers.

4. The method of claim 1, and further comprising:
identifying computers that are a source of similar and coordinated communication; and
only monitoring communications between a pair of computers if at least one of the computers of the pair has been identified as a source of similar and coordinated communication.

5. The method of claim 1, and further comprising:
using a self-organizing map to arrange the representations of the evolution of the data flow by similarity, and wherein only representations within a limited range of similarity are compared.

6. The method of claim 1, wherein clustering is used and wherein the representation of the evolution of the data flow comprises a sequence of clusters of the flow metric.

7. The method of claim 6, wherein comparing the representations includes determining if any cluster of the representation of the evolution of the first data flow matches more than one cluster of the representation of the evolution of the second data flow.

8. The method of claim 7, wherein a match between clusters is determined based on the separation of the centres of the clusters, the support of the clusters or the radius of the clusters.

9. The method of claim 8, wherein remediating communication comprises one or more of: blocking; filtering, and switching.

10. The method of claim 6, wherein comparing the representations includes determining if a pair of first clusters and a pair of second clusters of the representation of the evolution of the first data flow and the representation of the evolution of the second data flow match.

11. The method of claim 1, further comprising:
remediating communication between the first pair of computers and/or the second pair of computers if they are identified as exhibiting illegitimate communication.

12. The method of claim 1, further comprising clearing a representation of the evolution of a data flow from memory when the data flow is determined unlikely to correspond to illegitimate communication.

13. The method of claim 12, wherein the representation of the evolution is removed from memory if the age of the representation of the evolution is greater than the age of the representation of the evolution of the first data flow or second data flow for the first pair of computers and the second pair of computers that have been identified as exhibiting illegitimate communication.

14. The method of claim 12, wherein the representation of the evolution is removed from memory a fixed period of time after the first pair of computers and the second pair of computers that have been identified as exhibiting illegitimate communication.

15. The method of claim 1, wherein each data flow over the network is treated separately at a network level by a tuple including a source IP address and a destination IP address.

16. The method of claim 1, wherein the method identifies botnets and pairs of computers exhibiting botnet communication behaviour.

17. A data processing apparatus comprising one or more data processing devices and one or more non-transitory computer readable media, the non-transitory computer readable medium or media storing computer program code executable by the data processing device or devices to carry out a real-time method of identifying similar and coordinated communications between a plurality of computers connected by a network, the method comprising:
monitoring communications between a plurality of pairs of computers over the network to obtain a first flow metric for a first pair of computers and a second flow metric for a second pair of computers, wherein the first flow metric represents at least one property of a first data flow between the first pair of computers and the second flow metric represents at least one property of a second data flow between the second pair of computers;

updating a representation of the evolution of the first data flow between the first pair of computers using the first flow metric or updating a representation of the evolution of the second data flow between the second pair of computers using the second flow metric;

comparing the representation of the evolution of the first data flow and the representation of the evolution of the second data flow to determine the similarity of the first data flow and the second data flow; and identifying the first pair of computers and the second pair of computers as exhibiting similar and coordinated communication if the first data flow and second data flow are determined to be similar.

18. The data processing apparatus of claim 17, wherein the data processing apparatus includes or comprises a router.

19. The data processing apparatus of claim 17, wherein the apparatus is distributed over different physical devices which are in communication.

20. One or more non-transitory computer readable media storing computer program code executable by one or more data processing devices to carry out a real-time method of identifying similar and coordinated communications between a plurality of computers connected by a network, the method comprising:

monitoring communications between a plurality of pairs of computers over the network to obtain a first flow metric for a first pair of computers and a second flow metric for a second pair of computers, wherein the first flow metric represents at least one property of a first data flow between the first pair of computers and the second flow metric represents at least one property of a second data flow between the second pair of computers;

updating a representation of the evolution of the first data flow between the first pair of computers using the first flow metric or updating a representation of the evolution of the second data flow between the second pair of computers using the second flow metric;

comparing the representation of the evolution of the first data flow and the representation of the evolution of the second data flow to determine the similarity of the first data flow and the second data flow; and identifying the first pair of computers and the second pair of computers as exhibiting similar and coordinated communication if the first data flow and second data flow are determined to be similar.

\* \* \* \* \*